(12) United States Patent
Imagawa et al.

(10) Patent No.: US 8,441,538 B2
(45) Date of Patent: May 14, 2013

(54) IMAGE GENERATION APPARATUS AND IMAGE GENERATION METHOD

(75) Inventors: Taro Imagawa, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/745,949

(22) PCT Filed: Nov. 25, 2008

(86) PCT No.: PCT/JP2008/003459
§ 371 (c)(1),
(2), (4) Date: Jun. 3, 2010

(87) PCT Pub. No.: WO2009/072250
PCT Pub. Date: Jun. 11, 2009

(65) Prior Publication Data
US 2010/0271515 A1    Oct. 28, 2010

(30) Foreign Application Priority Data

Dec. 4, 2007 (JP) .................................. 2007-313721

(51) Int. Cl.
*H04N 5/228* (2006.01)
(52) U.S. Cl.
USPC .................................................... 348/208.13
(58) Field of Classification Search ............... 348/208.1, 348/208.4, 208.6, 208.12, 208.13, 208.16, 348/208.99, 239, 241, 243, 244, 262, 263, 348/265, 268, 269, 272, 297, 456, 493
See application file for complete search history.

(56) References Cited

U.S. PATENT DOCUMENTS 5,475,428 A * 12/1995 Hintz et al. .................... 348/263
5,523,786 A *  6/1996 Parulski ........................ 348/269
(Continued)

FOREIGN PATENT DOCUMENTS

CN    101052988    10/2007
JP    2003-70008    3/2003
(Continued)

OTHER PUBLICATIONS

International Search Report issued Mar. 3, 2009 in International (PCT) Application No. PCT/JP2008/003459.

(Continued)

*Primary Examiner* — Aung S Moe
*Assistant Examiner* — Chriss Yoder, III
(74) *Attorney, Agent, or Firm* — Wenderoth, Lind & Ponack, L.L.P.

(57) ABSTRACT

To provide an image generation apparatus that generates a visually-favorable target video sequence in color using input video sequences of color components and that is least likely to have an insufficient transfer rate when obtaining the input video sequences. The image generation apparatus includes: an image receiving unit (101) that receives, as the plurality of input video sequences, a plurality of video sequences that are obtained by shooting the same subject with a phase difference being set between frame exposure periods of the different color components; and a color image integration unit (103) that generates the target video sequence whose frame cycle is shorter than each of the frame exposure periods of the input video sequences, by reducing a difference between a frame image of the input video sequence of each color component and a sum of a plurality of frame images of the target video sequence which are included in a period that corresponds to the frame image of the input video sequence.

18 Claims, 19 Drawing Sheets

(a) Input video sequences (b) Target video sequence

U.S. PATENT DOCUMENTS

| | | | | |
|---|---|---|---|---|
| 5,541,706 A * | 7/1996 | Goto | .............................. | 396/231 |
| 6,697,109 B1 * | 2/2004 | Daly | .............................. | 348/268 |
| 7,146,581 B2 * | 12/2006 | Klein | .............................. | 716/103 |
| 7,486,730 B2 * | 2/2009 | Van Dijk et al. | ......... | 375/240.01 |
| 7,596,177 B2 | 9/2009 | Imagawa et al. | | |
| 7,693,327 B2 * | 4/2010 | Hahn et al. | .................... | 382/162 |
| 2005/0057687 A1 * | 3/2005 | Irani et al. | .................... | 348/443 |
| 2005/0219642 A1 | 10/2005 | Yachida et al. | | |
| 2006/0146189 A1 * | 7/2006 | Riemens et al. | .............. | 348/453 |
| 2007/0189386 A1 * | 8/2007 | Imagawa et al. | ......... | 375/240.12 |

FOREIGN PATENT DOCUMENTS

| | | | |
|---|---|---|---|
| JP | 2003-070008 | * | 3/2003 |
| JP | 2003-203237 | | 7/2003 |
| JP | 2005-318548 | | 11/2005 |

OTHER PUBLICATIONS

Matsunobu, T. et al., *Generation of High Resolution Video Using Morphing, Technical Report of IEICE*, PRMU2004-178 (Jan. 2005), pp. 85-90 (including English Abstract).

Watanabe, K. et al., *Generation of High Resolution Video Sequence from Two Video Sequences with Different Spatio-temporal Frequencies, Information Technology Letters* (FIT2004), vol. 3, No. LI-004 (2004), pp. 169-172 (including English Summary).

Anandan, P., *A Computational Framework and an Algorithm for the Measurement of Visual Motion, International Journal of Computer Vision*, vol. 2 (1989), pp. 283-310.

Zelnik-Manor, L. et al., *Multi-body Segmentation: Revisiting Motion Consistency, ECCV* (2002), pp. 1-12.

* cited by examiner

FIG. 4
(a) Input video sequences with long exposure time
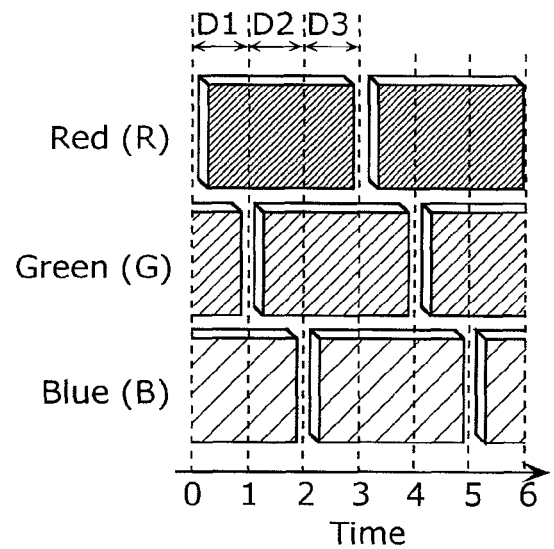
(b) Input video sequences with short exposure time
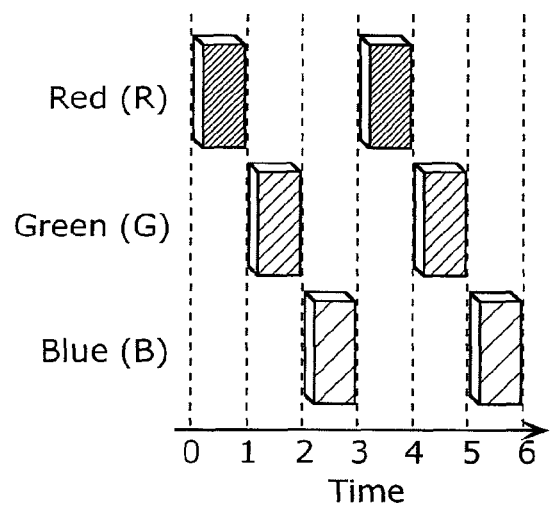
(c) Target video sequence
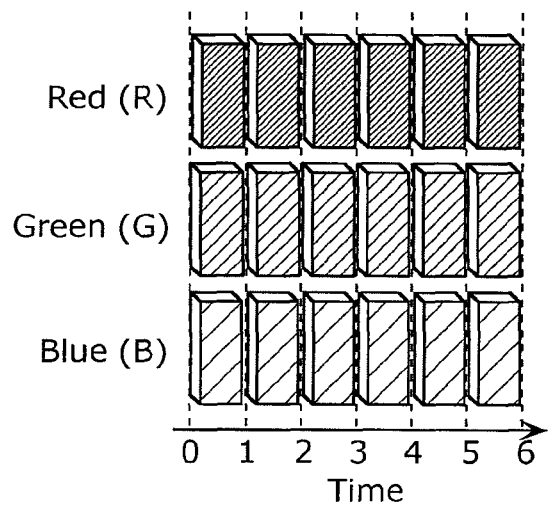

FIG. 5
(a) Multielement system
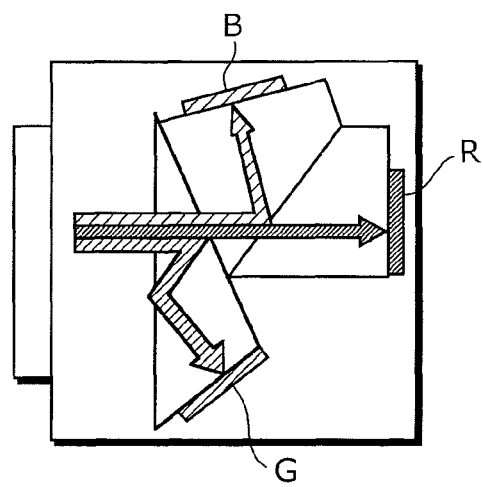
(b) Monoelement multilayer system
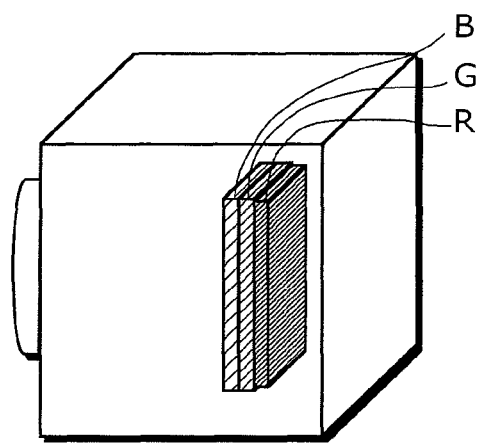
(c) Monoelement monolayer system
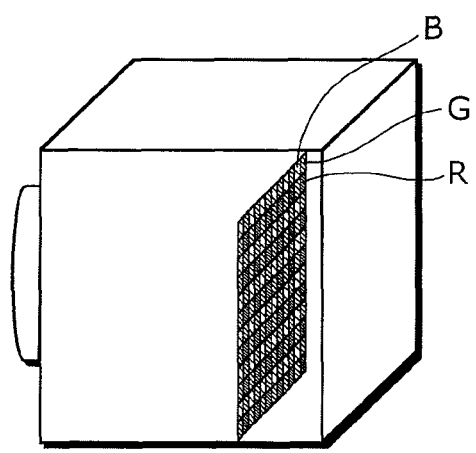

FIG. 18
(a) Input video sequences
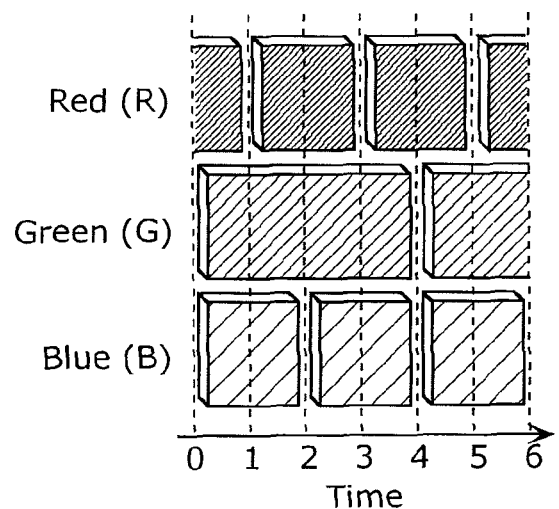
(b) Target video sequence
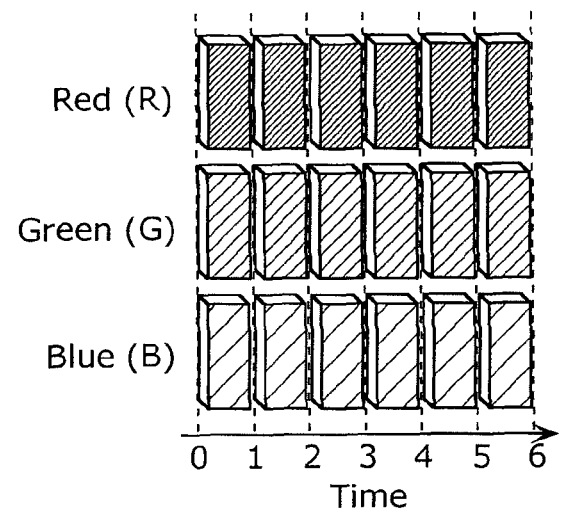

IMAGE GENERATION APPARATUS AND IMAGE GENERATION METHOD

TECHNICAL FIELD

The present invention relates to an image generation apparatus that generates a video sequence, and particularly to an image generation apparatus that generates, from a plurality of video sequences, a new video sequence superior in image quality to the plurality of video sequences.

BACKGROUND ART

With the development of digital imaging devices, it has become possible to capture high-resolution still images at a relatively low cost. However, it remains difficult to capture moving images that smoothly move at high speed (for example, at a high frame rate of approximately 30 to 60 frames per second or a higher frame rate than this) with a resolution equivalent to that of the aforementioned high-resolution still images.

The reason for the difficulty is that since an enormous amount of image information is obtained per unit time in the case of a high-speed high-resolution image capturing, a transfer rate of image information becomes insufficient in an imaging device. The problem of the transfer rate can be solved by using an image capturing apparatus that employs a special imaging device whereby the image information can be transferred in parallel. However, such an image capturing apparatus is costly and also causes another problem that properties of the imaging device need to be adjusted.

As an example of a conventional image generation method of obtaining a high-speed high-resolution (namely, high spatiotemporal resolution) video sequence from a limited amount of video information, the following method is known. That is, there is an image generation method whereby morphing is performed through detecting corresponding points between a frame of a video sequence captured by a high-speed low-resolution camera and a frame of a video sequence captured by a low-speed high-resolution camera (see Patent Reference 1, for example).

FIG. 19 is a block diagram showing a configuration of a conventional image generation apparatus disclosed in Patent Reference 1. In FIG. 19, a high-speed low-resolution camera A01 and a low-speed high-resolution camera A02 are shooting the same subject in synchronization with each other at the same angle of view. With reference to FIG. 19, a conventional image generation method is described.

FIG. 20 is a diagram showing moving images obtained through the image capturing performed by the camera A01 and the camera A02. In FIG. 20, frame images respectively captured by the camera A01 and the camera A02 are shown in chronological order. A frame B01 and a frame B02 represent frame images captured by the camera A02, while frames B11 to B15 represent frame images captured by the camera A01.

Here, a difference in resolution between the frame images is shown by a difference in image size. As compared to the frames B01 and B02, the frames B11 to B15 have a smaller number of pixels and thus a lower resolution. However, the frame rate of the camera A01 for capturing images is higher than that of the camera A02. The camera A01 captures four frames while the camera A02 captures one frame.

Timings at which the camera A02 and the camera A01 capture respective frames synchronize with each other. For example, the frame B01 and the frame B11 are captured at the same time, and the frame B02 and the frame B15 are also captured at the same time.

The following is a description about an example of a method of generating an intermediate frame B23 which is a frame to be inserted in the low-speed high-resolution video sequence corresponding to the time at which the frame B13 is captured.

A primary matching unit A03 obtains a correspondence relation of pixels between adjacent frames in the high-speed low-resolution video sequence captured by the camera A01. Here, the correspondence relation of pixels refers to a relation between a pixel in one frame image and a pixel in another frame image, each of these pixels representing the same specific part of the subject.

By combining the correspondence relations of pixels between the adjacent frames, from the frame B11 to the frame B13 of the high-speed low-resolution video sequence, the primary matching unit A03 obtains the correspondence relation of pixels between the frame B11 and the frame B13. The time at which the frame B11 is captured corresponds to the time at which the frame B01 of the low-speed high-resolution video sequence is actually captured. Similarly, the time at which the frame B13 is captured corresponds to a time of the frame B23 that is to be inserted in the low-speed high-resolution video sequence.

Next, a secondary matching unit A04 combines: a positional relation of pixels between the frame B01 of the low-speed high-resolution video sequence and the frame B11 of the high-speed low-resolution video sequence that are captured at the same time; a positional relation of pixels between the frame B13 and the frame B23 which correspond to each other in terms of time; and the correspondence relation of pixels between the frame B11 and the frame B13, which has been obtained by the primary matching unit A03. As a result of this, the secondary matching unit A04 determines the correspondence relation of pixels between the frame B01 and the frame B23.

Next, an image generation unit A05 determines pixel values of the frame B23 using the pixel values of the frame B01 on the basis of the correspondence relation of pixels between the frame B01 and the frame B23, so as to generate the high-resolution intermediate frame B23.

According to this procedure, other intermediate frames are similarly generated. In consequence, a high-resolution high-speed video sequence is generated.

Likewise, Non-Patent Reference 1 and Non-Patent Reference 2 disclose how to generate a high-resolution intermediate frame image using a video sequence captured by a high-speed low-resolution camera and a video sequence captured by a low-speed high-resolution camera. To be more specific, motion estimation is performed on the frames of the video sequence captured by the high-speed low-resolution camera. Then, on the basis of the result of the motion estimation, morphing is performed on the video sequence captured by the low-speed high-resolution camera so as to generate the high-resolution intermediate frame image.

As described so far, according to the conventional technique, a high-speed high-resolution video sequence is obtained by generating high-resolution intermediate frame images through combining high-speed low-resolution moving images and low-speed high-resolution moving images and then inserting each generated intermediate frame image in the low-speed high-resolution video sequence. This is to say, the high-speed high-resolution video sequence can be generated using a smaller amount of image information than the actual amount of image information required to originally generate a high-speed high-resolution video sequence. This can ease the problem of the insufficient transfer rate of image information that is caused when high-speed high-resolution moving images are actually captured.

Patent Reference 1: Japanese Unexamined Patent Application Publication No. 2003-203237 (FIG. 18)

Non-Patent Reference 1: Toru MATSUNOBU, et al., "Generation of High Resolution Video Using Morphing", Technical report of IEICE, PRMU 2004-178

Non-Patent Reference 2: Kiyotaka Watanabe, et al., "Generation of High Resolution Video Sequence from Two Video Sequences with Different Spatio-temporal Frequencies", Information Technology Letters (FIT2004), Vol. 3, No. LI-004, 2004

DISCLOSURE OF INVENTION

Problems that Invention is to Solve

Here, a case where the aforementioned conventional technique is applied in order to generate a color high-speed high-resolution video sequence is examined.

To be brief, it is possible to generate the color high-speed high-resolution video sequence as follows. Using a color high-speed low-resolution camera and a color low-speed high-resolution camera, high-speed low-resolution video sequences and low-speed high-resolution video sequences are respectively obtained in three color components, which are red, green, and blue. Then, the obtained video sequences in these color components are processed separately according to the aforementioned conventional technique.

With this configuration, however, it is necessary to obtain a plurality of video sequences for each color component. This means that the amount of information would be an amount corresponding to a multiple of the number of color components as compared to the amount of information of the high-speed low-resolution video sequence and low-speed high-resolution video sequence obtained using the conventional technique. In other words, there is a high possibility that the problem of the insufficient transfer rate of image information may be caused again.

Moreover, since the video sequences are separately processed for each color component, an incorrect pixel value which is glaring as a false color in the high-speed high-resolution moving image is easily generated. For this reason, it is difficult to generate a natural high-speed high-resolution video sequence that is visually perceived without a feeling of strangeness.

The present invention is conceived in view of the above problems, and has an object to provide an image generation apparatus that generates a visually-favorable target video sequence in color using input video sequences of the different color components and that is least likely to have an insufficient transfer rate when obtaining the input video sequences.

Means to Solve the Problems

In order to achieve the above object, an image generation apparatus according to an aspect of the present invention is an image generation apparatus that generates a target video sequence in color from a plurality of input video sequences, each input video sequence corresponding to a different color component, the image generation apparatus including: an image receiving unit which receives, as the plurality of input video sequences, a plurality of video sequences that are obtained by shooting a same subject with a phase difference being set between frame exposure periods of the different color components; and an image integration processing unit which generates the target video sequence whose frame cycle is shorter than each of the frame exposure periods of the input video sequences, by reducing a difference between a frame image of the input video sequence of each of the different color components and a sum of a plurality of frame images of the target video sequence which are included in a period that corresponds to the frame image of the input video sequence.

It should be noted here that the present invention can be realized not only as the above image generation apparatus, but also as, for example: an image generation method; a program that causes a computer to execute this method; and a computer-readable recording medium, such as a CD-ROM, on which this program is stored.

Effects of the Invention

According to the aspect of the present invention, the target video sequence in color is generated from the input video sequences of the plurality of different color components, with the frame exposure periods of the input video sequences of at least two color components not coinciding with each other.

Thus, the temporal peaks in the amount of information of the input video sequences are distributed, so that the transfer rate of the apparatus that is required to obtain the input video sequences is leveled out. Hence, an insufficient transfer rate is least likely to be caused. This is different from the case of obtaining a plurality of input video sequences to which consideration of delaying the frame exposure timings is not given, such as a case where an input video sequence is simply obtained for each of the plurality of color components according to the conventional technique.

Moreover, since the frame exposure periods of at least two color components do not coincide with each other, the target video sequence can be generated from the input video sequence including information with a higher level of temporal resolution, as compared to a case where the timings of the frame exposure periods of the color components are all the same.

Furthermore, the target video sequence is generated by calculating the plurality of pixel values which maintain the color space constraint condition. This condition indicates that the colors of the pixels spatiotemporally adjacent in the target video sequence should be continuous.

As a result, unlike the case where the conventional technique is applied to the pixel values separately for each of the single-color components, such as red, green, and blue, the color continuity can be maintained and the pixel values which are not glaring as false colors can be obtained. Hence, the target video sequence that is visually favorable can be generated.

BRIEF DESCRIPTION OF DRAWINGS

FIGS. 4 (a) and (b) are diagrams each showing an example of respective frame exposure periods of color components in input video sequences, while FIG. 4 (c) is a diagram showing an example of respective virtual frame exposure periods of color components in a target video sequence.

FIGS. 5 (a) to (c) are diagrams showing specific examples of the image capturing apparatus.

FIG. 18 (a) is a diagram showing an example of respective frame exposure periods of color components in input video sequences, while FIG. 18 (b) is a diagram showing an example of respective virtual frame exposure periods of color components in a target video sequence.

NUMERICAL REFERENCES

Figure 1:
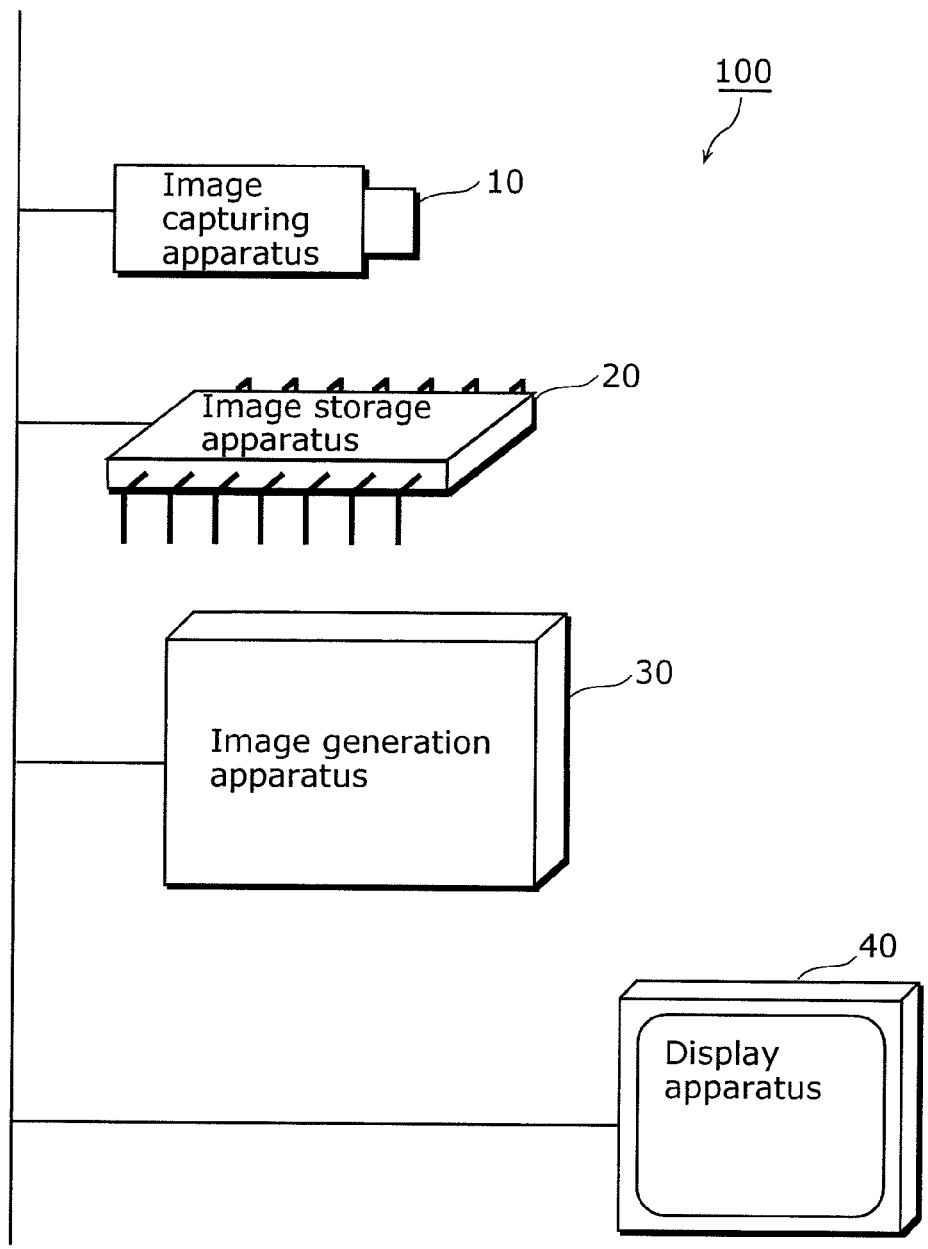
FIG. 1 is a block diagram showing a hardware configuration of an image generation system in an embodiment of the present invention.

10 Image capturing apparatus
20 Image storage apparatus
30 Image generation apparatus
40 Display apparatus
100 Image generation system
101 Image receiving unit
101a Red image receiving unit
101b Green image receiving unit
101c Blue image receiving unit
102 Motion estimation unit
102a Motion distribution calculation unit
102b Motion confidence level distribution calculation unit
103 Color image integration unit
103a Motion constraint unit
103b Color space constraint unit
103c Reduction constraint unit
103d Image integration processing unit
104 Image capturing control unit
104a Exposure determination unit
104b Color phase difference determination unit
104c Light amount sensor
104d Temperature sensor
300 Camera
400 Display appliance

BEST MODE FOR CARRYING OUT THE INVENTION

An image generation apparatus according to an aspect of the present invention is an image generation apparatus that generates a target video sequence in color from a plurality of input video sequences, each input video sequence corresponding to a different color component, the image generation apparatus including: an image receiving unit which receives, as the plurality of input video sequences, a plurality of video sequences that are obtained by shooting a same subject with a phase difference being set between frame exposure periods of the different color components; and an image integration processing unit which generates the target video sequence whose frame cycle is shorter than each of the frame exposure periods of the input video sequences, by reducing a difference between a frame image of the input video sequence of each of the different color components and a sum of a plurality of frame images of the target video sequence which are included in a period that corresponds to the frame image of the input video sequence.

With this configuration, the target video sequence in color is generated from the input video sequences of the plurality of different color components, with the frame exposure periods of the input video sequences of at least two color components not coinciding with each other. Thus, the temporal peaks in the amount of information of the input video sequences are distributed, so that the transfer rate of the apparatus that is required to obtain the input video sequences is leveled out. Hence, an insufficient transfer rate is least likely to be caused. This is different from the case of obtaining a plurality of input video sequences to which consideration of delaying the frame exposure timings is not given, such as a case where an input video sequence is simply obtained for each of the plurality of color components according to the conventional technique.

Also, the image generation apparatus may further include an image capturing control unit which determines an amount of delay between the frame exposure periods of the input video sequences according to image capturing condition information regarding an amount of noise included in the input video sequences, wherein the image receiving unit receives, as the plurality of input video sequences, the plurality of video sequences that are obtained by shooting the same subject with the phase difference being set between the frame exposure periods of the different color components according to the determined amount of delay.

Here, the image capturing condition information may indicate an amount of light received from the subject, and the image capturing control unit may increase the phase difference as the amount of received light indicated by the image capturing condition information decreases. Also, the image capturing condition information may indicate a temperature of an imaging element that shoots the subject, and the image capturing control unit may increase the phase difference as the temperature indicated by the image capturing condition information increases.

With this configuration, the phase difference in the exposure periods between the different color components is increased in the case of shooting a dark subject or in the case of a high temperature environment, where an S/N ratio (signal-to-noise ratio) is likely to decrease. Accordingly, the image capturing is executed, with at least either the frame interval or exposure period of the input video sequence being increased. This allows the generation of a target video sequence whose S/N ratio is prevented from decreasing.

Moreover, the image generation apparatus may further include a color space constraint unit which sets a color space constraint condition indicating that colors of pixels spatiotemporally adjacent in the target video sequence should be continuous, wherein the image integration processing unit may generate the target video sequence by calculating, using the plurality of input video sequences, a plurality of pixel values that maintain the color space constraint condition.

Furthermore, the color space constraint unit may separately set, as the color space constraint condition, a first constraint condition indicating that luminance of the adjacent pixels should be continuous and a second constraint condition indicating that chrominance of the adjacent pixels should be continuous.

With this configuration, the image generation apparatus generates the target video sequence by calculating the plurality of pixel values which maintain the color space constraint condition. This condition indicates that the colors of the pixels spatiotemporally adjacent in the target video sequence should be continuous. As a result, unlike the case where the conventional technique is applied to the pixel values separately for each of the single-color components, such as red, green, and blue, the color continuity can be maintained and the pixel values which are not glaring as false colors can be obtained. Hence, the target video sequence that is visually favorable can be generated.

Also, the image integration processing unit in the image generation apparatus may generate each frame image of the target video sequence such that the frame of each color component in the target video sequence changes at a time when a frame of at least one input video sequence out of the plurality of input video sequences changes.

With this configuration, the target video sequence can be generated at a frame rate which is equal to or higher than the frame rate of the input video sequence. Moreover, the timings of frame change are in agreement between the input video sequence and the target video sequence, so that the correspondence of the pixel values between the input video sequence and the target video sequence become clear. Hence, the processing to generate the target video sequence can be simplified.

Moreover, the image generation apparatus may further include: a motion estimation unit which estimates a motion of the subject from at least one of the plurality of input video sequences; and a motion constraint unit which sets a motion constraint condition indicating that values of pixels in the target video sequence should be continuous based on the estimated motion, wherein the image integration processing unit may generate the target video sequence by calculating a plurality of pixel values that maintain the color space constraint condition and the motion constraint condition.

With this configuration, since the result of the motion estimation is taken into consideration, the target video sequence which is visually more favorable can be obtained.

Moreover, the image receiving unit of the image generation apparatus may receive, as the plurality of input video sequences, the video sequences of the color components that are obtained by shooting the same subject in such a manner that the frame exposure periods of at least two color components overlap each other.

With this configuration, the frame exposure period of one color component can be extended to overlap with the frame exposure period of another color component. This is suitable for long-exposure image capturing, such as when the amount of light reflected from the subject is small.

Furthermore, the image receiving unit of the image generation apparatus may receive, as the plurality of input video sequences, the video sequences of the color components that are obtained by shooting the same subject in such a manner that the frame exposure periods of the color components do not overlap one another.

This configuration allows the target video sequence to be generated from the input video sequences of the color components, each of which includes information with a high level of temporal resolution. Moreover, since the frame exposure periods of the color components do not overlap one another, it is suitable for an application where a single imaging element obtains input video sequences of a plurality of color components in a time-sharing manner using a color filter whose color characteristics of reflectance or transmittance can be controlled. In such a case, the color characteristics of the color filter are caused to vary periodically.

Also, the image receiving unit of the image generation apparatus may receive, as the plurality of input video sequences, the video sequences of the color components that are obtained by shooting the same subject in such a manner that respective intervals between frame exposure start times of the different color components are equal.

With this configuration, the temporal peaks in the amount of information of the input video sequences are distributed more evenly. This makes the transfer rate of the apparatus that is required to obtain the input video sequences unlikely to become insufficient.

(Embodiment)

The following is a detailed description of an image generation system of the embodiment of the present invention, with reference to the drawings.

FIG. 1 is a block diagram showing a hardware configuration of an image generation system 100 in the embodiment of the present invention.

The image generation system 100 is a system that: obtains input video sequence data for each of a plurality of different color components by shooting the same subject, with frame exposure periods (at least either exposure start times or exposure end times) of at least two color components out of the plurality of different color components not coinciding with each other; and generates, from the input video sequence data obtained for each color component, target video sequence data in color whose frame rate is higher than that of the input video sequence data.

At least using a color space constraint condition, the image generation system 100 generates the target video sequence data from the input video sequence data of the color components by calculating a plurality of pixel values that maintain the color space constraint condition. This color space constraint condition indicates that the colors of pixels spatiotemporally adjacent in a moving image should be continuous.

Note that a pixel color is represented by a numeric value. Also note that when the colors of adjacent pixels are continuous, this means that the numeric values representing the colors of these adjacent pixels are continuous.

It should be noted here that the numeric value representing a color does not refer to a pixel value obtained solely from a single color component, such as red, green, or blue. Note that this numeric value is derived from pixel values of a plurality of color components (for example, the numeric value represents: a ratio of pixel values of the plurality of color components; a color difference; a hue; and saturation).

It should also be noted here that when the numeric values are continuous, this means either that the numeric values are uniform (first order differential values or first order difference values are small) or that changes in the numeric values are uniform (second order differential values or second order difference values are small), or means both of the above.

Hereinafter, the input video sequence data and the target video sequence data are respectively referred to as the input video sequence and the target video sequence for short.

The image generation system 100 includes an image capturing apparatus 10, an image storage apparatus 20, an image generation apparatus 30, and a display apparatus 40.

The image capturing apparatus 10 is a camera that outputs video sequences of a plurality of different color components (for example, three video sequences corresponding to three color components, namely, red, green, and blue) by shooting the same subject from the same viewpoint or from viewpoints so close to each other that a parallax can be ignored, with frame exposure periods of these color components not coinciding with one another.

The image storage apparatus 20 is a memory that temporarily stores the plurality of video sequences outputted from the image capturing apparatus 10.

The image generation apparatus 30 is an apparatus that reads the plurality of video sequences stored in the image storage apparatus 20 as a plurality of input video sequences and that generates, from the read plurality of input video sequences, a target video sequence in color having a higher frame rate.

The display apparatus 40 is a display apparatus that displays video shown by the target video sequence that is generated by the image generation apparatus 30.

It should be noted that the image generation apparatus 30 in this configuration is an example of the image generation apparatus of the present invention. The image generation apparatus 30 may be realized as hardware such as a dedicated circuit or as software such as an image processing program used in a general purpose computer.

Figure 2:
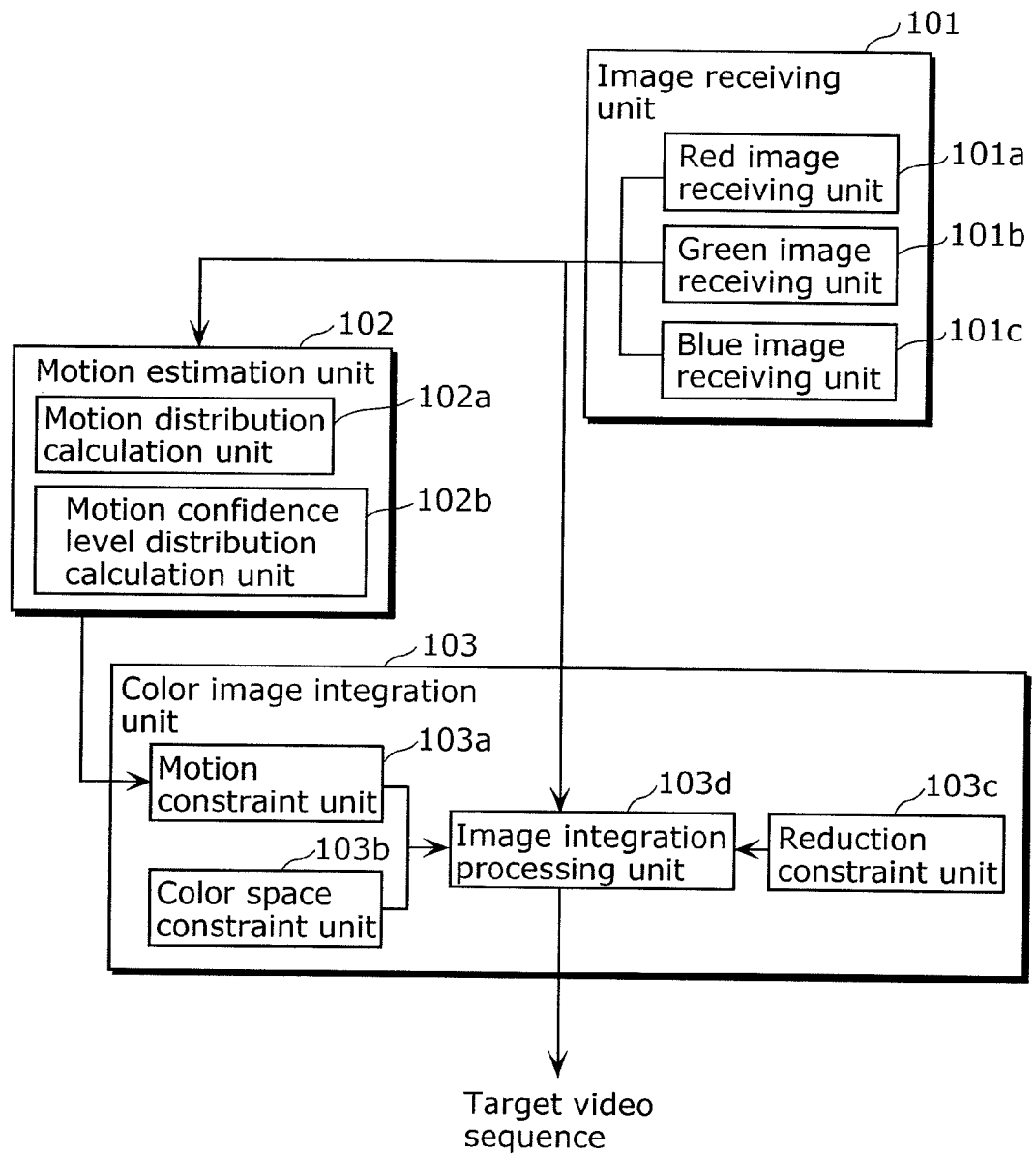
FIG. 2 is a function block diagram showing a configuration of an image generation apparatus in the embodiment of the present invention.

FIG. 2 is a function block diagram showing an internal configuration of the image generation apparatus 30 of the image generation system 100 shown in FIG. 1. The image generation apparatus 30 includes an image receiving unit 101, a motion estimation unit 102, and a color image integration unit 103.

The image receiving unit 101 is an interface that receives a plurality of input video sequences. The image receiving unit 101 has a red image receiving unit 101a, a green image receiving unit 101b, and a blue image receiving unit 101c that respectively receive the input video sequences of the red, green, and blue color components.

As described above, the input video sequences respectively inputted to the red image receiving unit 101a, the green image receiving unit 101b, and the blue image receiving unit 101c are obtained by shooting the same subject from the same viewpoint or from the viewpoints so close to each other that a parallax can be ignored. Each input video sequence corresponds to a different color component and has a different frame exposure period.

Hereinafter, the input video sequences respectively inputted to the red image receiving unit 101a, the green image receiving unit 101b, and the blue image receiving unit 101c may also referred to as the red input video sequence, the green input video sequence, and the blue input video sequence, respectively.

The motion estimation unit 102 is a processing unit that estimates motion of the subject appearing in the input video sequences inputted to the image receiving unit 101. The motion estimation unit 102 has a motion distribution calculation unit 102a and a motion confidence level distribution calculation unit 102b.

The motion distribution calculation unit 102a performs the motion estimation for each pixel location of a frame image of the input video sequence.

The motion confidence level distribution calculation unit 102b calculates a confidence level of the result of the motion estimation performed by the motion distribution calculation unit 102a, for each of a plurality of areas in the frame image.

Here, a plurality of motions and a plurality of confidence levels calculated for the plurality of frame images and the plurality of pixel locations in each frame image are respectively referred to as the motion spatiotemporal distribution (or simply as the motion distribution) and the confidence level spatiotemporal distribution (or simply as the confidence level distribution).

The color image integration unit 103 is a processing unit that generates the target video sequence in color from the plurality of input video sequences of the different color components inputted to the image receiving unit 101, by calculating the pixel values that maintain constraint conditions described later. The color image integration unit 103 has a motion constraint unit 103a, a color space constraint unit 103b, a reduction constraint unit 103c, and an image integration processing unit 103d. The frame rate of the generated target video sequence is higher than the frame rates of the input video sequences.

The motion constraint unit 103a sets a constraint condition that each pixel value of the target moving image should satisfy depending on the result of the motion estimation performed by the motion distribution calculation unit 102a for each pixel location. The constraint condition set by the motion constraint unit 103a is referred to as the motion constraint condition. The motion constraint condition indicates that the values of the pixels in the target moving image should be continuous in accordance with the motions estimated by the motion distribution calculation unit 102a.

The color space constraint unit 103b sets a constraint condition that each pixel value of the target moving image should satisfy depending on the color continuity, aside from the result of the motion estimation. The constraint condition set by the color space constraint unit 103b is referred to as the color space constraint condition. The color space constraint condition indicates that the colors of the pixels spatiotemporally adjacent in the target moving image should be continuous.

The reduction constraint unit 103c sets a constraint condition that each pixel value of the target moving image should satisfy depending on image capturing processes of the input video sequences inputted to the image receiving unit 101. The constraint condition set by the reduction constraint unit 103c is referred to as the reduction constraint condition. The reduction constraint condition indicates that a frame image of the input video sequence should approximate to a weighted sum of a plurality of frame images of the target video sequence which are included in a period that corresponds to this frame image of the input video sequence.

The image integration processing unit 103d generates the target video sequence in color from the input video sequences of the different color components inputted to the image receiving unit 101, by calculating the pixel values that maintain the motion constraint condition, the color space constraint condition, and the reduction constraint condition respectively set by the motion constraint unit 103a, the color space constraint unit 103b, and the reduction constraint unit 103c.

It should be noted that a "frame" used in the present embodiment includes not only a progressive frame, but also an interlaced frame having even-numbered and odd-numbered fields.

Next, the processing executed by the image generation apparatus 30 configured as described above is explained.

Figure 3:
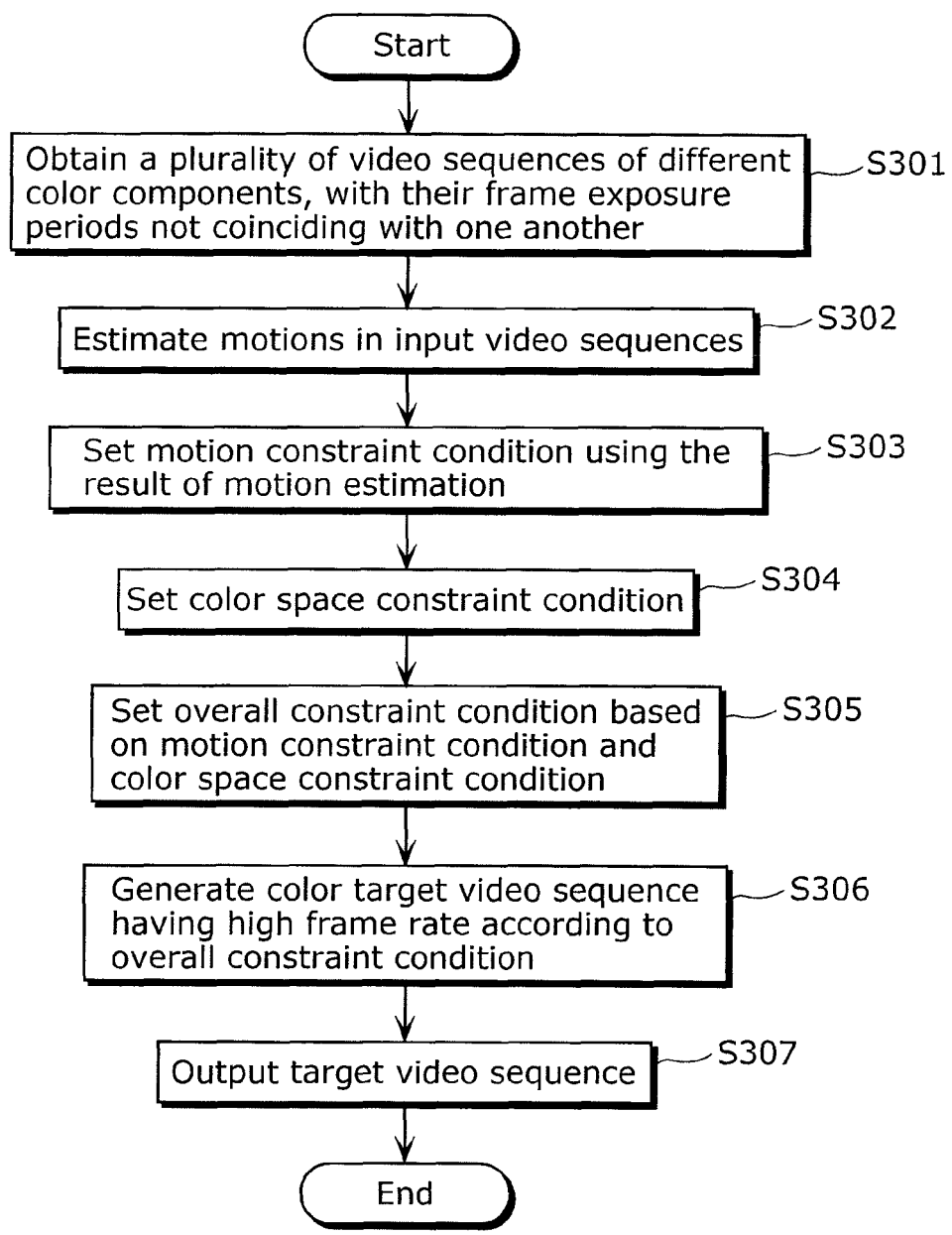
FIG. 3 is a flowchart showing an operation performed by the image generation apparatus.

FIG. 3 is a flowchart showing an example of the processing executed by the image generation apparatus 30.

In step S301, the red image receiving unit 101a, the green image receiving unit 101b, and the blue image receiving unit 101c respectively receive the red input video sequence, the green input video sequence, and the blue input video sequence.

Here, a relation between a frame exposure period of an input video sequence and a frame exposure period of a target video sequence is explained.

FIGS. 4 (a) and (b) are diagrams showing two different examples of the respective frame exposure periods of the red input video sequence, the green input video sequence, and the blue input video sequence.

FIG. 4 (c) is a diagram showing an example of respective virtual frame exposure periods of the color components in the target video sequence.

In each of FIGS. 4 (a), (b), and (c), the horizontal axis denotes time and the vertical axis denotes the color components. Each box represents a frame exposure period, and a width of the box in the horizontal direction represents a length of the frame exposure period (namely, the exposure time). The red (R), green (G), and blue (B) color components are illustrated by thickly shaded boxes, shaded boxes, and thinly shaded boxes respectively. Dotted lines in the vertical direction represent time intervals corresponding to the frame rate of the target video sequence.

The input video sequences of the color components shown in FIGS. 4 (a) and (b) have the same frame rate (the same number of frames per unit time). However, the length of the frame exposure period is different between the frame in FIG. 4 (a) and the frame in FIG. 4 (b).

To be more specific, FIG. 4 (a) shows input moving images each captured with a long exposure period (approximately equivalent to a frame interval) for each frame, whereas FIG. 4 (b) shows input moving images each captured with a short exposure period (approximately one third of the frame interval) for each frame.

Moreover, in both of FIGS. 4 (a) and (b), the frame exposure start time and frame exposure end time of a frame in an input video sequence are different for each color component. Here, take notice that the frame exposure periods of the color components do not coincide with one another.

In FIG. 4 (a): D1 corresponds to a delay in the frame exposure period between the red input video sequence and the green input video sequence (the delay is referred to as the color phase difference); D2 corresponds to a delay between the green input video sequence and the blue input video sequence; and D3 corresponds to a delay between the blue input video sequence and the red input video sequence. In FIG. 4 (b) too, delays identical to those in FIG. 4 (a) are provided in the frame exposure periods among the input video sequences of the color components.

As for the target video sequence (FIG. 4 (c)), a higher frame rate is obtained for each color component as compared to the cases of the input video sequences (FIGS. 4 (a) and (b)), and also the same frame exposure period is obtained for each color component. It should be noted that the spatial resolution and image size of an individual frame image in the target video sequence are the same as those of an individual frame image in the input video sequence.

Next, a method of obtaining the three input video sequences of the different color components by shooting the same subject is explained, with reference to specific examples of the configuration of the image capturing apparatus 10.

FIGS. 5 (a), (b), and (c) are diagrams of specific examples, each of which shows a different configuration of the image capturing apparatus 10.

For example, as shown in FIG. 5 (a), the subject is shot by the image capturing apparatus 10 in which three R, G, and B imaging elements (or cameras) are arranged in such a manner that they have the same field of view and the same viewpoint by way of dichroic prisms or dichroic mirrors in two stages. Accordingly, the three input video sequences of the respective color components can be obtained.

Moreover, as shown in FIG. 5 (b), the subject may be shot by the image capturing apparatus 10 that employs a single multilayered imaging element including R, G, and B layers each of which has a different chromatic sensitivity. With this, the three input moving images of the respective color components may be obtained at the one pixel location.

Furthermore, as shown in FIG. 5 (c), the subject may be shot by the image capturing apparatus 10 that employs an imaging element in which a plurality of kinds of pixels, namely, R, G, and B each having a different chromatic sensitivity are spatially periodically arranged. With this, the three input video sequences of the respective color components can be obtained. In this case, although the spatial resolution decreases, there is an advantage whereby image capturing can be executed by an imaging element employing a color filter array (the Bayer arrangement or the like) that is commonly used.

By shooting the subject using the image capturing apparatus 10 configured as described above, a plurality of video sequences of the subject captured in the respective color components from the same viewpoint can be obtained. In this image capturing, the frame exposure start time (or the frame exposure end time) is changed for each color component. As a result, the input video sequences where the frame exposure periods of the color components do not coincide with one another can be obtained as shown in FIGS. 4 (a) and (b).

Next, relations that should be satisfied by each ideal pixel value of the target video sequence (FIG. 4 (c)) and each pixel value of the input video sequences (FIGS. 4 (a) and (b)) are represented by Equation 1, Equation 2, and Equation 3. As described later, these relations are also used as the reduction constraint condition indicating that a frame image of the input video sequence should approximate to a weighted sum of a plurality of frame images of the target video sequence which are included in a period that corresponds to this frame image of the input video sequence.

[Math. 1]

$$R_L(x, y, t_{RL}) = \sum_{t=t_{R0}+t_{RL} \times f_R}^{t_{R0}+t_{RL} \times f_R + e_R} w_R(x, y, t) \cdot R_H^*(x, y, t) \quad \text{(Equation 1)}$$

[Math. 2]

$$G_L(x, y, t_{GL}) = \sum_{t=t_{G0}+t_{GL} \times f_G}^{t_{G0}+t_{GL} \times f_G + e_G} w_G(x, y, t) \cdot G_H^*(x, y, t) \quad \text{(Equation 2)}$$

[Math. 3]

$$B_L(x, y, t_{BL}) = \sum_{t=t_{B0}+t_{BL}\times f_B}^{t_{B0}+t_{BL}\times f_B+e_B} w_B(x, y, t) \cdot B_H^*(x, y, t) \quad \text{(Equation 3)}$$

In Equation 1, Equation 2, and Equation 3, $R^*_H(x, y, t)$, $G^*_H(x, y, t)$, and $B^*_H(x, y, t)$ respectively represent a red (R) pixel value, a green (G) pixel value, and a blue (B) pixel value (each of which is an ideal value) at a pixel location (x, y) in the $t^{th}$ frame image of the target video sequence.

Moreover: $R_L(x, y, t_{RL})$ represents a pixel value at a pixel location (x, y) in the $t_{RL}^{th}$ frame image of the red input video sequence; $G_L(x, y, t_{GL})$ represents a pixel value at a pixel location (x, y) in the $t_{GL}^{th}$ frame image of the green input video sequence; and $B_L(x, y, t_{BL})$ represents a pixel value at a pixel location (x, y) in the $t_{BL}^{th}$ frame image of the blue input video sequence.

Here, note that the explanation is given on the understanding: that the spatial resolution and image size of an individual frame image of the color components in the target video sequence are the same as those of an individual frame image of the color components in the input video sequences; and that the coordinate system (x, y) specifying a spatial pixel location is common to every individual frame image.

In consideration of the frame exposure periods that do not coincide among the input video sequences of the different color components, the frame numbers assigned to the red input moving image, the green input moving image, and the blue input moving images are represented by $t_{RL}$, $t_{GL}$, and $t_{BL}$ respectively.

Also, $e_R$, $e_G$, and $e_B$ respectively represent the frame exposure periods of the red input video sequence, the green input video sequence, and the blue input video sequence. Moreover, $f_R$, $f_G$, and $f_B$ respectively represent the frame intervals of the red input video sequence, the green input video sequence, and the blue input video sequence.

Furthermore, $t_{R0}$, $t_{G0}$, and $t_{B0}$ respectively represent the frame start times that are to be standards corresponding to the red input moving images, the green input moving images, and the blue input moving images. In the present invention, these values are set to be different from one another, so as to change the frame exposure start time for each color component of the input video sequences. It should be noted that in Equation 1, Equation 2, and Equation 3, the frame interval of the target video sequence is expressed as a minimum unit of a time interval from one exposure start time to the next.

Also, each of $w_R(x, y, t)$, $w_G(x, y, t)$, and $w_B(x, y, t)$ is a weight depending on the pixel location (x, y) and the frame number t, in the case of associating a pixel value of the target moving image with the corresponding pixel value of the red input moving image, the green input moving image, and the blue input moving image. The weight represents a gain, an aperture time, and a positional dependence of the camera in the actual image capturing. Each value of $w_R(x, y, t)$, $w_G(x, y, t)$, and $w_B(x, y, t)$ represents an image capturing condition and is information that can be obtained together with the input video sequences.

Here, a relation between a pixel value of the input moving image shown in FIG. 4 (a) and a pixel value of the target moving image shown in FIG. 4 (c) is expressed on the basis of Equation 1, Equation 2, and Equation 3. For example, the frame exposures of the color components separately start in the following order: the red color component, then the green color component, and then the blue color component. Hence, the relation is expressed as $t_{R0}=0$, $t_{G0}=1$, and $t_{B0}=2$. The frame exposure period is the same among the red, green, and blue components, and thus the relation is expressed as $e_R=e_G=e_B=3$. Also, the value of the weight assigned to the pixel value is common to all the color components, and the relation is expressed as $w_R(x, y, t)=w_G(x, y, t)=w_B(x, y, t)=1.0$. Moreover, the frame intervals of the red, green, and blue components are equivalent, and thus the relation is expressed as $f_R=f_G=f_B=3$.

Also, a relation between a pixel value of the input moving image shown in FIG. 4 (b) and a pixel value of the target moving image shown in FIG. 4 (c) is expressed on the basis of Equation 1, Equation 2, and Equation 3. Since the variations in the frame exposure start times of the color components are the same as in the case of FIG. 4 (a), the relation is expressed as $t_{R0}=0$, $t_{G0}=1$, and $t_{B0}=2$. However, each of the frame exposure periods of the red, green, and blue components is shorter as compared to the frame exposure period shown in FIG. 4 (a), and thus the relation is expressed as $e_R=e_G=e_B=1$. The value of the weight assigned to the pixel value is common to all the color components, and the relation is expressed as $w_R(x, y, t)=w_G(x, y, t)=w_B(x, y, t)=1.0$. Moreover, the frame intervals of the red, green, and blue components are equivalent, and thus the relation is expressed as $f_R=f_G=f_B=3$.

In the above example, time is described as being discrete. However, time may be described as being continuous, and the definitions identical to the above may be provided by replacing the add operations in Equation 1, Equation 2, and Equation 3 with integrations.

Figure 6:
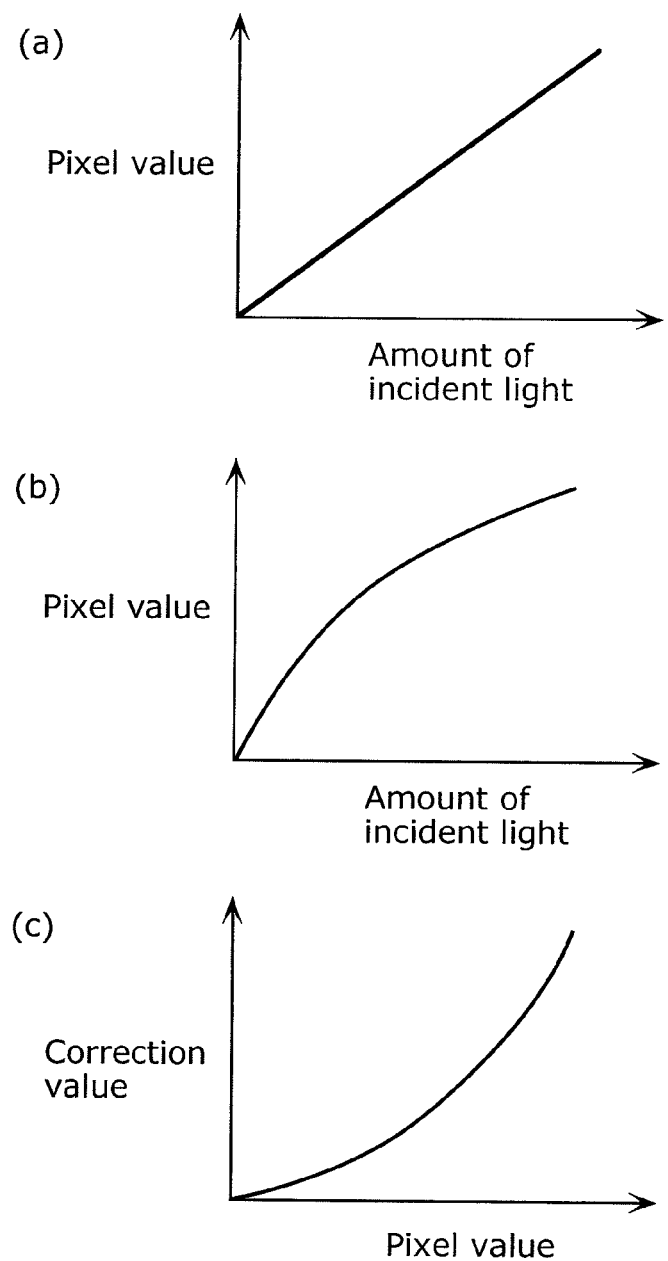
FIGS. 6 (a) to (c) are graphs each showing an example of a relation between the amount of incident light and a pixel value for a case where the pixel value is to be corrected.

In the above example, the explanation has been given on the assumption that a pixel value of the input moving image is proportional to the amount of incident light received at the time of image capturing (FIG. 6 (a)). However, in the case where the pixel value is not proportional to the amount of incident light due to γ correction or the like (FIG. 6 (b)) or where a proportionality constant is different for each pixel, it is preferable that the following correction be performed.

To be more specific, input-output characteristics (a relation between a pixel value and the amount of incident light) of the imaging element used for capturing the input video sequence are separately calculated in advance, and then inverse characteristics obtained by inversing the input and output of the calculated input-output characteristics are applied to the pixel value of the input moving image. As a result, a correction value having a proportional relation to the amount of incident light is obtained. Then, using the obtained correction value, the pixel value of the target moving image that satisfies Equation 1, Equation 2, and Equation 3 is calculated.

For example, when the pixel values are obtained by the imaging element having the input-output characteristics as shown in FIG. 6 (b), the pixel values are corrected using the correspondence relation between the pixel value and the correction value that is shown in FIG. 6 (c). Accordingly, the obtained correction values can be processed in the same manner as the pixel values which are obtained by the imaging element having the input-output characteristics as shown in FIG. 6 (a) and which are thus proportional to the amount of incident light (meaning that the correction is unnecessary for these pixel values).

Next, in step S302, the motion estimation 102 calculates, using the input video sequences of the color components: the motion spatiotemporal distribution between the adjacent frame images in the target video sequence; and the confidence level spatiotemporal distribution of the result of the motion estimation.

As one example, a method of calculating the motions and confidence levels of the target video sequence using the red input video sequence is explained.

The motion to be estimated between the adjacent frame images in the red input video sequence is expressed as $v_R(x, y, t_{RL})$, and the confidence level of the motion estimation is expressed as $\text{conf}_R(x, y, t_{RL})$. Here, the motion is indicated by a motion vector typically. The confidence level of the motion estimation is indicated by a scalar value denoting that when a value is greater, the result of the motion estimation is more certain and that when a value is smaller, the result of the motion estimation is more likely to have an error.

In order to calculate a motion between the corresponding positions in the images of the two adjacent frames, the following methods may be employed for instance: the method disclosed by P. ANANDAN in "A computational Framework and an Algorithm for the Measurement of Visual Motion", IJCV, 2, 283-310 (1989) (Non-Patent Reference 3); a motion estimation method that is commonly used in video coding; and a feature point tracking method that is used for tracking a mobile object using images.

Moreover, the motion estimation may be performed for each of a plurality of areas and the result may be used as the motions at individual pixel locations, according to a method, such as a common method of estimating global motion (affine motion or the like) of a whole image or the method disclosed by Lihi Zelkik-Manor in "Multi-body Segmentation: Revisiting Motion Consistency", ECCV (2002) (Non-Patent Reference 4).

The confidence level may be calculated according to the method disclosed in Non-Patent Reference 3 mentioned above. In the case of the motion estimation using block matching, the definition provided by Equation 4 may be used.

[Math. 4]

$$\text{conf}_R(x, y, t_{RL}) = \text{SSD}_{max} - \sum_{i \in \text{block}} \sum_{j \in \text{block}} \left\{ R_L(x+i, y+j, t_{RL}) - R_L \begin{pmatrix} x + v_{Rx}(x, y, t_{RL}) + i, \\ y + v_{RY}(x, y, t_{RL}) + j, \\ t_{RL} + 1 \end{pmatrix} \right\}^2 \quad \text{(Equation 4)}$$

Here, Equation 4 defines the confidence level $\text{conf}_R(x, y, t_{RL})$ at the pixel location (x, y) of the $t_{RL}{}^{th}$ frame image in the red input video sequence. In Equation 4, $v_{Rx}(x, y, t_{RL})$ and $V_{Ry}(x, y, t_{RL})$ respectively represent an x component and a y component of a motion vector $v_R(x, y, t_{RL})$ estimated at the pixel location (x, y) of the $t_{RL}{}^{th}$ frame image in the red input video sequence. Moreover, i∈block and j∈block represent ranges of block areas to be used in block matching.

In Equation 4, a value obtained by subtracting a sum of squares of differences in pixel values between blocks corresponding to the motion from a maximum possible value $\text{SSD}_{max}$ of the sum of squares is used as the confidence level. To be more specific, a value which is obtained by reversing sign of the sum of squares of the differences in the pixels values between the blocks is used as the confidence level.

Also, in the case where the global motion estimation or the motion estimation for each area is performed on the image, a value obtained by subtracting a sum of squares of differences in pixel values between a neighborhood area of a motion starting point and a neighborhood area of a motion ending point at the individual pixel locations from a maximum possible value $\text{SSD}_{max}$ of the sum of squares can be used as the confidence level.

By applying the above method to the red input video sequence, the motion $v_R(x, y, t_{RL})$ between the adjacent frame images in the red input video sequence and the confidence level $\text{conf}_R(x, y, t_{RL})$ are calculated.

Here, considering that the frame interval is usually different between the input video sequence and the target video sequence, the motion $v_R(x, y, t_{RL})$ and the confidence level $\text{conf}_R(x, y, t_{RL})$ calculated for the input video sequence are converted to a motion v (x, y, t) and a confidence level conf (x, y, t) of the target video sequence.

As one example, a method of converting the motion and the confidence level estimated for the red input video sequence shown in FIG. 4 (b) to the motion and the confidence level of the target video sequence shown in FIG. 4 (c) is represented by Equation 5, Equation 6, and Equation 7.

[Math. 5]

$$v(x, y, t) = \frac{1}{3} \cdot v_R(x, y, t_{RL}) \quad \text{(Equation 5)}$$

[Math. 6]

$$v(x + v_x(x, y, t), y + v_y(x, y, t), t+1) = \frac{1}{3} \cdot v_R(x, y, t_{RL}) \quad \text{(Equation 6)}$$

[Math. 7]

$$v(x + 2 \cdot v_x(x, y, t), y + 2 \cdot v_y(x, y, t), t+2) = \frac{1}{3} \cdot v_R(x, y, t_{RL}) \quad \text{(Equation 7)}$$

Suppose that, in Equation 5, Equation 6, and Equation 7, the exposure start time of the $t^{th}$ frame in the target video sequence is the same as that of the $t_{RL}{}^{th}$ frame in the red input video sequence. The motion $v_R(x, y, t_{RL})$ estimated between the adjacent frames in the red video sequence corresponds to the motions among three frames in the target video sequence. On account of this, a motion equivalent to one third of the motion estimated at the pixel location (x, y) in the $t_{RL}{}^{th}$ frame image of the input video sequence is set as the motion v (x, y, t) at the corresponding pixel location in the $t^{th}$ frame image of the target video sequence (Equation 5).

Next, the same vector is set as a motion vector at a pixel location which is a destination of the motion v (x, y, t) in the $t+1^{th}$ frame image of the target video sequence (Equation 6). Likewise, the same vector is set for the $t+2^{th}$ frame image of the target video sequence (Equation 7).

As conf (x, y, t) of the target video sequence, the confidence level $\text{conf}_R(x, y, t_{RL})$ calculated for the corresponding pixel location of the red input moving images is used as it is.

Here, in the case where the motion vector is defined with sub-pixel accuracy or is not uniform, a motion vector is not necessarily assigned to every pixel location through the motion distribution calculated using Equation 6 and Equation 7. In such a case, a motion vector may be calculated by interpolating from the motion vector having been defined in a spatial neighborhood. As an interpolation method, a common method such as bilinear interpolation and bicubic interpolation can be used.

In the above example, the motion distribution and the confidence level distribution of the target video sequence are set on the basis of the motion distribution and the confidence level distribution calculated for the red input video sequence. Through the same procedure, on the basis of the motion distribution and the confidence level distribution calculated for the green input video sequence or the blue input video sequence, the motion distribution and the confidence level distribution of the target video sequence may be set.

In the case where the motion distribution is calculated using the input video sequence of a single color component and the color distribution of a moving subject can be determined in advance, it is desirable to use images that contain a high proportion of this color component.

Moreover, the motion distribution and the confidence level distribution of the target video sequence may be set using values obtained by averaging the motion distributions and the confidence level distributions that are respectively calculated for the input video sequences of the color components. When the color distribution of the subject is unknown or the general versatility is to be improved, it is desirable to use a plurality of color components.

Next, in step S303, the motion constraint unit 103a sets a motion constraint condition $Q_m$ that should be satisfied by the target video sequence. According to Equation 8, the motion constraint unit 103a sets the motion constraint condition $Q_m$ using the motion distribution and the confidence level distribution calculated for the target video sequence by the motion estimation unit 102.

[Math. 8]

$$Q_m = \sum_x \sum_y \sum_t conf(x, y, t) \cdot \begin{bmatrix} \left\{ R_H \begin{pmatrix} x + v_x(x, y, t), \\ y + v_y(x, y, t), \\ t+1 \end{pmatrix} - \right\}^2 \\ R_H(x, y, t) \end{bmatrix} + \begin{bmatrix} \left\{ G_H \begin{pmatrix} x + v_x(x, y, t), \\ y + v_y(x, y, t), \\ t+1 \end{pmatrix} - \right\}^2 \\ G_H(x, y, t) \end{bmatrix} + \begin{bmatrix} \left\{ B_H \begin{pmatrix} x + v_x(x, y, t), \\ y + v_y(x, y, t), \\ t+1 \end{pmatrix} - \right\}^2 \\ B_H(x, y, t) \end{bmatrix}$$ (Equation 8)

In Equation 8, each Σ refers to an addition of corresponding x, y, or t, and in terms of results, the motion constraint condition $Q_m$ defines the target video sequence. Equation 8 defines that a value of the motion constraint condition $Q_m$ become smaller when the pixel values of the color components in the target video sequence are more uniform (that is, when the pixel values are more continuous) at the corresponding pixel locations in accordance with the motions estimated for the input video sequence. In Equation 8, the amount of change in the pixel values is weighted by the confidence level of the motion.

When the value of the motion constraint condition $Q_m$ should be small, this means that the pixel values in the target video sequence should be continuous in accordance with the motions estimated for the input video sequence.

Next, in step S304, the color space constraint unit 103b sets a color space constraint condition $Q_s$ that should be satisfied by the target video sequence. First, $Q_{s1}$ and $Q_{s2}$ which are examples of the color space constraint condition $Q_s$ are expressed below by Equation 9 and Equation 10, respectively.

Then, $Q_{s3}$ which is another example of the color space constraint condition $Q_s$ is expressed by Equation 11 later.

[Math. 9]

$$Q_{s1} = \sum_x \sum_y \sum_t \begin{bmatrix} \lambda_\theta(x, y, t) \cdot \begin{Bmatrix} 4 \cdot \theta_H(x, y, t) - \\ \theta_H(x, y-1, t) - \\ \theta_H(x, y+1, t) - \\ \theta_H(x-1, y, t) - \\ \theta_H(x+1, y, t) \end{Bmatrix}^2 + \\ \lambda_\varphi(x, y, t) \cdot \begin{Bmatrix} 4 \cdot \varphi_H(x, y, t) - \\ \varphi_H(x, y-1, t) - \\ \varphi_H(x, y+1, t) - \\ \varphi_H(x-1, y, t) - \\ \varphi_H(x+1, y, t) \end{Bmatrix}^2 + \\ \lambda_r(x, y, t) \cdot \begin{Bmatrix} 4 \cdot r_H(x, y, t) - \\ r_H(x, y-1, t) - \\ r_H(x, y+1, t) - \\ r_H(x-1, y, t) - \\ r_H(x+1, y, t) \end{Bmatrix}^2 \end{bmatrix}$$ (Equation 9)

[Math. 10]

$$Q_{s2} = \sum_x \sum_y \sum_t \begin{bmatrix} \lambda_\theta(x, y, t) \cdot \begin{Bmatrix} 6 \cdot \theta_H(x, y, t) - \\ \theta_H(x, y-1, t) - \\ \theta_H(x, y+1, t) - \\ \theta_H(x-1, y, t) - \\ \theta_H(x+1, y, t) - \\ \theta_H(x, y, t-1) - \\ \theta_H(x, y, t+1) \end{Bmatrix}^2 + \\ \lambda_\varphi(x, y, t) \cdot \begin{Bmatrix} 6 \cdot \varphi_H(x, y, t) - \\ \varphi_H(x, y-1, t) - \\ \varphi_H(x, y+1, t) - \\ \varphi_H(x-1, y, t) - \\ \varphi_H(x+1, y, t) - \\ \varphi_H(x, y, t-1) - \\ \varphi_H(x, y, t+1) \end{Bmatrix}^2 + \\ \lambda_r(x, y, t) \cdot \begin{Bmatrix} 6 \cdot r_H(x, y, t) - \\ r_H(x, y-1, t) - \\ r_H(x, y+1, t) - \\ r_H(x-1, y, t) - \\ r_H(x+1, y, t) - \\ r_H(x, y, t-1) - \\ r_H(x, y, t+1) \end{Bmatrix}^2 \end{bmatrix}$$ (Equation 10)

In each of Equation 9 and Equation 10, $\theta_H$(x, y, t), $\psi_H$(x, y, t), and $r_H$(x, y, t) represent coordinate values of the case where the locations expressed by the respective red, green and blue pixel values at the pixel location (x, y) in the $t^{th}$ frame image of the target video sequence in a three-dimensional orthogonal color space (namely, the so-called RGB color space) are expressed by a spherical coordinate system (θ, ψ, r) that corresponds to the RGB color space. Here, $\theta_H$(x, y, t) and $\psi_H$(x, y, t) represent two kinds of angles of deviation, and $r_H$(x, y, t) represents a radial distance.

Figure 7:
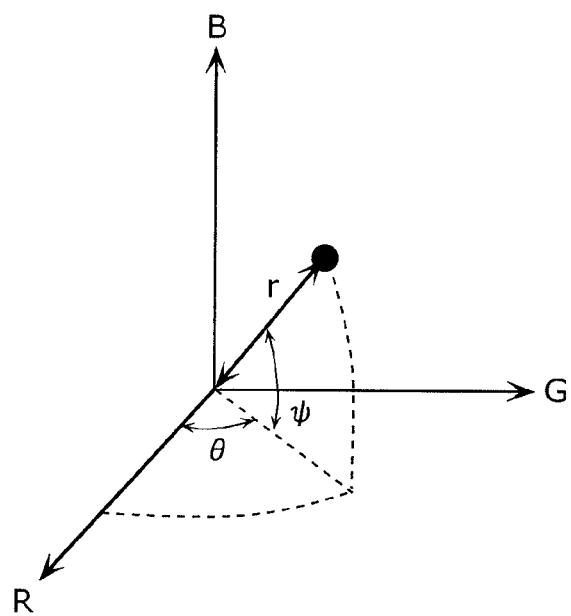
FIG. 7 is a diagram showing an example of a correspondence between an RGB color space and a spherical coordinate system.

FIG. 7 shows an example of a correspondence between the RGB color space and the spherical coordinate system (θ, ψ, r). In FIG. 7, a direction expressed as θ=0 is a positive direction of an R axis in the RGB color space and a direction expressed as ψ=0 is a positive direction of a G axis in the RGB color space, as an example. However, reference directions of the angles of deviation are not limited to the directions shown in FIG. 7, and may be different directions. According to such a correspondence, the red, green, and blue pixel values which are coordinate values in the RGB color space are converted to coordinate values of the spherical coordinate system ($\theta, \psi, r$), for each pixel.

Here, suppose that each pixel value of the target moving image is considered as a three-dimensional vector in the RGB color space. In this case, this three-dimensional vector is expressed by the spherical coordinate system ($\theta, \psi, r$) that can be associated with the RGB color space. As a consequence, coordinate values of an r axis representing the magnitude of the vector showing pixel luminance (which is synonymous with signal intensity and brightness) and coordinate values of $\theta$ and $\psi$ axes representing the directions of the vector showing pixel chrominance (including hue, color difference, and saturation) can be separately processed.

Equation 9 defines a sum of squares of second order differences, in an x-y space direction, of the pixel values expressed by the spherical coordinate system of the target video sequence. Equation 9 defines that a value of the color space constraint condition $Q_{s1}$ become smaller when the changes in the values of pixels, expressed by the spherical coordinate system, that are spatially adjacent in the individual frame of the target video sequence are more uniform (that is, when the pixel colors are more continuous).

When the value of the color space constraint condition $Q_{s1}$ should be small, this means that the colors of pixels spatially adjacent in the target moving image should be continuous.

Equation 10 defines a sum of squares of second order differences, in an x-y-t space direction, of the pixel values expressed by the spherical coordinate system of the target video sequence. Equation 10 defines that a value of the color space constraint condition $Q_{s2}$ become smaller when: the changes in the values of pixels, expressed by the spherical coordinate system, that are spatially adjacent in the individual frame of the target video sequence are more uniform (that is, when the pixel colors are more continuous); and also the changes in the values of pixels, expressed by the spherical coordinate system, that are located at the same location in the individual frames temporally adjacent in the target video sequence are more uniform (that is, when the pixel colors are more continuous).

When the value of the color space constraint condition $Q_{s2}$ should be small, this means that the colors of pixels spatiotemporally adjacent in the target moving image should be continuous.

In an image, the change in the pixel luminance and the change in the pixel color are caused due to physically different reasons. On account of this, as shown in Equation 9 and Equation 10, the constraint condition regarding the continuity of the pixel luminance (the uniformity in the changes of the coordinate values of the r axis) (the condition is represented in the third term inside the square brackets in each of Equation 9 and Equation 10) is set separately from the constraint conditions regarding the continuity of the pixel chrominance (the uniformity in the changes of the coordinate values for each of the $\theta$ and $\psi$ axes) (the conditions are represented in the first and second terms inside the square brackets in each of Equation 9 and Equation 10). With this, it becomes easier to obtain a desirable image quality.

Here, $\lambda_\theta(x, y, t), \lambda_\psi(x, y, t)$, and $\lambda_r(x, y, t)$ are weights that are predetermined and are applied at the pixel location (x, y) in the $t^{th}$ frame image of the target video sequence, corresponding to the respective constraint conditions set using the coordinate values of the $\theta, \psi,$ and r axes. Simply stated, these weights may be set without depending on the pixel location or the frame, and thus may be set as $\lambda_\theta(x, y, t) = \lambda_\psi(x, y, t) = 1.0$ and $\lambda_r(x, y, t) = 0.01$, for example.

Preferably, these weights may be set smaller at a location where, for example, discontinuity in the pixel values of the image can be predicted. The discontinuity in the pixel values may be determined by whether an absolute value of a difference value or a second order differential value between the values of the pixels adjacent in the frame image of the input video sequence is equal to or greater than a certain value.

Moreover, it is desirable to set the weights applied to the constraint regarding the continuity in the pixel chrominance greater than the weights applied to the constraint regarding the continuity in the pixel luminance. This is because, as compared to the pixel chrominance, the pixel luminance of the image is more likely to change (i.e., to lack the uniformity of change), depending on irregularities on the surface of the subject or change in the orientation of the surface of the subject (i.e., change in the normal direction) caused by motion.

In Equation 9, the sum of squares of the second order differences, in the x-y space direction, of the pixel values expressed by the spherical coordinate system of the target video sequence is set as the color space constraint condition $Q_{s1}$. Also, in Equation 10, the sum of squares of the second order differences, in the x-y-t spatiotemporal direction, of the pixel values expressed by the spherical coordinate system of the target video sequence is set as the color space constraint condition $Q_{s2}$. Note, however, that a sum of absolute values of second order differences, a sum of squares of first order differences, or a sum of absolute values of first order differences may be set as the color space constraint condition.

In the above description, the color space constraint condition is set using the spherical coordinate system ($\theta, \psi, r$) that can be associated with the RGB color space. However, the coordinate system to be used is not limited to the spherical coordinate system. The same advantage as described can be produced by setting a color space constraint condition using a new orthogonal coordinate system having coordinate axes with which pixel luminance and pixel chrominance can be easily separated.

The coordinate axes of the new orthogonal coordinate system can be set as follows, for example. Principal component analysis is performed on the frequency distribution of pixel values in the RGB color space that are included in an input moving image or a different reference moving image, so that directions of eigenvectors are obtained. Then, the coordinate axes can be set in the obtained directions of the eigenvectors (i.e., set as the eigenvector axes).

[Math. 11]

$$Q_{s3} = \sum_x \sum_y \sum_t \left[ \lambda_{C1}(x,y,t) \cdot \begin{pmatrix} 4 \cdot C_1(x,y,t) - \\ C_1(x, y-1, t) - \\ C_1(x, y+1, t) - \\ C_1(x-1, y, t) - \\ C_1(x+1, y, t) \end{pmatrix}^2 + \lambda_{C2}(x,y,t) \cdot \begin{pmatrix} 4 \cdot C_2(x,y,t) - \\ C_2(x, y-1, t) - \\ C_2(x, y+1, t) - \\ C_2(x-1, y, t) - \\ C_2(x+1, y, t) \end{pmatrix}^2 + \lambda_{C3}(x,y,t) \cdot \begin{pmatrix} 4 \cdot C_3(x,y,t) - \\ C_3(x, y-1, t) - \\ C_3(x, y+1, t) - \\ C_3(x-1, y, t) - \\ C_3(x+1, y, t) \end{pmatrix}^2 \right]$$

(Equation 11)

In Equation 11, $C_1(x, y, t), C_2(x, y, t)$, and $C_3(x, y, t)$ represent rotation transforms whereby the coordinate values in the RGB color space that are red, green, and blue pixel values at the pixel location (x, y) in the $t^{th}$ frame image of the target video sequence are transformed into coordinate values corresponding to coordinate axes $C_1$, $C_2$, and $C_3$ of the new orthogonal coordinate system.

Equation 11 defines a sum of squares of second order differences, in the x-y space direction, of the pixel values expressed by the new orthogonal coordinate system of the target video sequence. Equation 11 defines that a value of the color space constraint condition $Q_{s3}$ become smaller when the changes in the values of pixels, expressed by the new orthogonal coordinate system, that are spatially adjacent in the individual frame of the target video sequence are more uniform (that is, when the pixel values are more continuous).

When the value of the color space constraint condition $Q_{s3}$ should be small, this means that the colors of pixels spatially adjacent in the target moving image should be continuous.

Here, $\lambda_{C1}(x, y, t)$, $\lambda_{C2}(x, y, t)$, and $\lambda_{C3}(x, y, t)$ are weights that are predetermined and are applied at the pixel location (x, y) in the $t^{th}$ frame image of the target video sequence, corresponding to the respective constraint conditions set using the coordinate values of the $C_1$, $C_2$, and $C_3$ axes.

When the $C_1$, $C_2$, and $C_3$ axes are eigenvectors, there is an advantage that the values of $\lambda_{C1}(x, y, t)$, $\lambda_{C2}(x, y, t)$, and $\lambda_{C3}(x, y, t)$ are separately set corresponding to the respective eigenvectors so that a suitable value of $\lambda$ can be set according to a variance value that is different for each eigenvector axis. More specifically, since the variance is expected to be small in the direction of a non-principal component and thus the sum of squares of second order differences is also small, the value of $\lambda$ is increased. On the other hand, in the direction of a principal component, the value of $\lambda$ is relatively reduced.

Up to this point, examples of three kinds of color space constraint conditions $Q_{s1}$, $Q_{s2}$, and $Q_{s3}$ have been explained. As the color space restrain condition Qs, any of the color space constraint conditions $Q_{s1}$, $Q_{s2}$, and $Q_{s3}$ can be used.

For instance, a case where the color space constraint conditions $Q_{s1}$ and $Q_{s2}$ shown in Equation 9 and Equation 10 are used is examined. In this case, with the introduction of the spherical coordinate system ($\theta$, $\psi$, r), the color space constraint condition is set by separately using the coordinate values of the $\theta$ and $\psi$ axes showing the color information and the coordinate values of the r axis showing the signal intensity. What is more, in this case, in setting the color space constraint condition, the weight parameters $\lambda$ respectively suitable for the color information and the signal intensity can be assigned. Hence, this case has an advantage that it becomes easier to generate a high-quality video sequence.

Meanwhile, in the case where the color space constraint condition $Q_{s3}$ shown in Equation 11 is used, the constraint condition is set on the basis of the coordinate values of the new orthogonal coordinate system that can be obtained from the coordinate values of the RGB color space through linear (rotation) transform. Hence, this case has an advantage that the operations can be simplified.

Moreover, since the coordinate axes $C_1$, $C_2$, and $C_3$ of the new orthogonal coordinate system are used as the eigenvector axes, the color space constraint condition can be set using the coordinate values of the eigenvector axes reflecting the change in the color having the effect on more pixels. On this account, as compared to the case where the color space constraint condition is set simply using the pixel values of the red, green, and blue components, an improvement can be expected in image quality of the target video sequence to be obtained.

So far, the explanation has been given as to an example of the case where, in the color space constraint conditions $Q_{s1}$, $Q_{s2}$, and $Q_{s3}$ shown in Equation 9, Equation 10, and Equation 11, the weight $\lambda$ is set small at a location where the discontinuity or the like in the pixel values of the image can be predicted. In the case where the discontinuity or the like in the pixel values of the image can be specifically predicted (when difference values or differential values can be specifically estimated), color space constraint conditions $Q_{s1d}$, $Q_{s2d}$, and $Q_{s3d}$ represented by Equation 12, Equation 13, and Equation 14 may be used.

[Math. 12]

$$Q_{s1d} = \sum_x \sum_y \sum_t \left[ \lambda_\theta(x,y,t) \cdot \begin{Bmatrix} 4 \cdot \theta_H(x,y,t) - \\ \theta_H(x, y-1, t) - \\ \theta_H(x, y+1, t) - \\ \theta_H(x-1, y, t) - \\ \theta_H(x+1, y, t) - \\ d_\theta(x, y, t) \end{Bmatrix}^2 + \lambda_\varphi(x,y,t) \cdot \begin{Bmatrix} 4 \cdot \varphi_H(x,y,t) - \\ \varphi_H(x, y-1, t) - \\ \varphi_H(x, y+1, t) - \\ \varphi_H(x-1, y, t) - \\ \varphi_H(x+1, y, t) - \\ d_\varphi(x, y, t) \end{Bmatrix}^2 + \lambda_r(x,y,t) \cdot \begin{Bmatrix} 4 \cdot r_H(x,y,t) - \\ r_H(x, y-1, t) - \\ r_H(x, y+1, t) - \\ r_H(x-1, y, t) - \\ r_H(x+1, y, t) - \\ d_r(x, y, t) \end{Bmatrix}^2 \right]$$

(Equation 12)

[Math. 13]

$$Q_{s2d} = \sum_x \sum_y \sum_t \left[ \lambda_\theta(x,y,t) \cdot \begin{Bmatrix} 6 \cdot \theta_H(x,y,t) - \\ \theta_H(x, y-1, t) - \\ \theta_H(x, y+1, t) - \\ \theta_H(x-1, y, t) - \\ \theta_H(x+1, y, t) - \\ \theta_H(x, y, t-1) - \\ \theta_H(x, y, t+1) - \\ d_\theta(x, y, t) \end{Bmatrix}^2 + \lambda_\varphi(x,y,t) \cdot \begin{Bmatrix} 6 \cdot \varphi_H(x,y,t) - \\ \varphi_H(x, y-1, t) - \\ \varphi_H(x, y+1, t) - \\ \varphi_H(x-1, y, t) - \\ \varphi_H(x+1, y, t) - \\ \varphi_H(x, y, t-1) - \\ \varphi_H(x, y, t+1) - \\ d_\varphi(x, y, t) \end{Bmatrix}^2 + \lambda_r(x,y,t) \cdot \begin{Bmatrix} 6 \cdot r_H(x,y,t) - \\ r_H(x, y-1, t) - \\ r_H(x, y+1, t) - \\ r_H(x-1, y, t) - \\ r_H(x+1, y, t) - \\ r_H(x, y, t-1) - \\ r_H(x, y, t+1) - \\ d_r(x, y, t) \end{Bmatrix}^2 \right]$$

(Equation 13)

[Math. 14]

$$Q_{s3d} = \sum_x \sum_y \sum_t \left[ \lambda_{C1}(x,y,t) \cdot \begin{Bmatrix} 4 \cdot C_1(x,y,t) - \\ C_1(x,y-1,t) - \\ C_1(x,y+1,t) - \\ C_1(x-1,y,t) - \\ C_1(x+1,y,t) - \\ d_{C1}(x,y,t) \end{Bmatrix}^2 + \lambda_{C2}(x,y,t) \cdot \begin{Bmatrix} 4 \cdot C_2(x,y,t) - \\ C_2(x,y-1,t) - \\ C_2(x,y+1,t) - \\ C_2(x-1,y,t) - \\ C_2(x+1,y,t) - \\ d_{C2}(x,y,t) \end{Bmatrix}^2 + \lambda_{C3}(x,y,t) \cdot \begin{Bmatrix} 4 \cdot C_3(x,y,t) - \\ C_3(x,y-1,t) - \\ C_3(x,y+1,t) - \\ C_3(x-1,y,t) - \\ C_3(x+1,y,t) - \\ d_{C3}(x,y,t) \end{Bmatrix}^2 \right]$$

(Equation 14)

The color space constraint conditions $Q_{s1d}$, $Q_{s2d}$, and $Q_{s3d}$ shown in the Equation 12, Equation 13, and Equation 14 are formed by respectively adding specific values $d_\theta(x, y, t)$, $d_\psi(x, y, t)$, $d_r(x, y, t)$, $d_{c1}(x, y, t)$, $d_{c2}(x, y, t)$, and $d_{c3}(x, y, t)$ to the color space constraint conditions $Q_{s1}$, $Q_{s2}$, and $Q_{s3}$ shown in Equation 9, Equation 10, and Equation 11. Here, the specific values are estimated in advance as the difference values or differential values corresponding to the coordinate axes $\theta$, $\psi$, $r$, $C_1$, $C_2$, and $C_3$.

As a method of estimating the above specific values, the following method may be employed for instance. The weighted-sum operations of the right-hand sides in Equation 1, Equation 2, and Equation 3 are performed individually for the color components to obtain contrastive low-resolution low-frame-rate video sequences corresponding to reference color high-resolution video sequences. Then, a correspondence relation of the difference values or differential values between the reference video sequence and the contrastive video sequence is prepared in advance. According to the correspondence relation, the specific values $d_\theta(x, y, t)$, $d_\psi(x, y, t)$, $d_r(x, y, t)$, $d_{c1}(x, y, t)$, $d_{c2}(x, y, t)$, and $d_{c3}(x, y, t)$ of the difference values or differential values of the target video sequence may be estimated from the input video sequences.

Using the color space constraint conditions $Q_{s1d}$, $Q_{s2d}$, and $Q_{s3d}$, it also becomes possible to enhance the image reproducibility at a location where discontinuity can be predicted, and thus improve the quality of the generated image.

Note that when the values $d_\theta(x, y, t)$, $d_\psi(x, y, t)$, $d_r(x, y, t)$, $d_{c1}(x, y, t)$, $d_{c2}(x, y, t)$, and $d_{c3}(x, y, t)$ are zero, the color space constraint conditions $Q_{s1d}$, $Q_{s2d}$, and $Q_{s3d}$ are equivalent to the color space constraint conditions $Q_{s1d}$, $Q_{s2}$, and $Q_{s3}$, respectively.

Next, in step S305, the image integration processing unit 103d sets an overall constraint condition (simply referred to as the constraint condition hereafter) that should be satisfied by the target video sequence, on the basis of the motion constraint condition $Q_m$ obtained in step S303, the color space constraint condition $Q_s$ obtained in step S304, and the reduction constraint condition set by the reduction constraint unit 103c.

[Math. 15]

$$J=|H_R R_H - R_L|^2 + |H_G G_H - G_L|^2 + |H_B B_H - B_L|^2 + Qs + Qm \quad \text{(Equation 15)}$$

Here, Equation 15 shows an example of a constraint condition J. The overall constraint condition J shown by Equation 15 is defined as a function of the red, green, and blue components (represented by $R_H$, $G_H$, and $B_H$, respectively) making up the target moving images.

$H_R$, $H_G$, and $H_B$ represent reduction transforms from the red, green, and blue components $R_H$, $G_H$, and $B_H$ of the target moving image to the red, green, and blue components $R_L$, $G_L$, and $B_L$ of the input moving image, respectively. Here, $H_R$, $H_G$, and $H_B$ are the respective weighted-sum operations of the right-hand sides in Equation 1, Equation 2, and Equation 3, for example.

The reduction constraint unit 103c performs the reduction transform on the red, green, and blue components individually so as to obtain a reduced moving image. Then, a sum of squares of differences in pixel values at the corresponding pixel locations of the corresponding frames between the reduced moving image and the input moving image is set as a reduction constraint condition (each of the first, second, and third terms of Equation 15). To be more specific, the reduction constraint condition is set on the basis of a value representing a magnitude of a difference vector between a vector whose element is an individual pixel value included in the reduced moving image and a vector whose element is an individual pixel value included in the input moving image.

The fourth term of Equation 15 represents the color space constraint condition obtained by the color space constraint unit 103b in step S304. The fifth term of Equation 15 represents the motion constraint condition obtained by the motion constraint unit 103a in step S303.

The constraint condition J is not limited to the above condition. The terms of Equation 15 may be replaced with terms formed from similar expressions. Or, a new term representing a different constraint may be added.

In step S306, each pixel value of the target moving image that maintains the constraint condition J set by the image integration processing unit 103d is calculated, so that the color components $R_H$, $G_H$, and $B_H$ of the target moving image are generated.

Here, to maintain the constraint condition J means to make the value of the constraint condition J as small as possible (preferably, at a minimum). Moreover, to maintain the constraint condition J includes making each value of the reduction constraint condition, the color space constraint condition, and the motion constraint condition that are expressed in the terms of the constraint condition J as small as possible (preferably, at a minimum).

Such a target video sequence where the value of the constraint condition J is at a minimum may be obtained by, for example, calculating Equation 16. In Equation 16, each of the expressions in which the constraint condition J is differentiated by the corresponding pixel value component of the color component $R_H$, $G_H$, or $B_H$ is set at 0. Alternatively, such a target video sequence may be obtained according to an iterative optimization method such as a steepest descent method.

[Math. 16]

$$\frac{\partial J}{\partial R_H(x,y,t)} = \frac{\partial J}{\partial G_H(x,y,t)} = \frac{\partial J}{\partial B_H(x,y,t)} = 0 \quad \text{(Equation 16)}$$

Lastly, in step S307, the generated target video sequence is outputted from the image integration processing unit 103d.

In the following, specific examples of the input moving images and the to-be-obtained target moving images are explained, with reference to FIGS. 8, 9, and 10.

Figure 8:
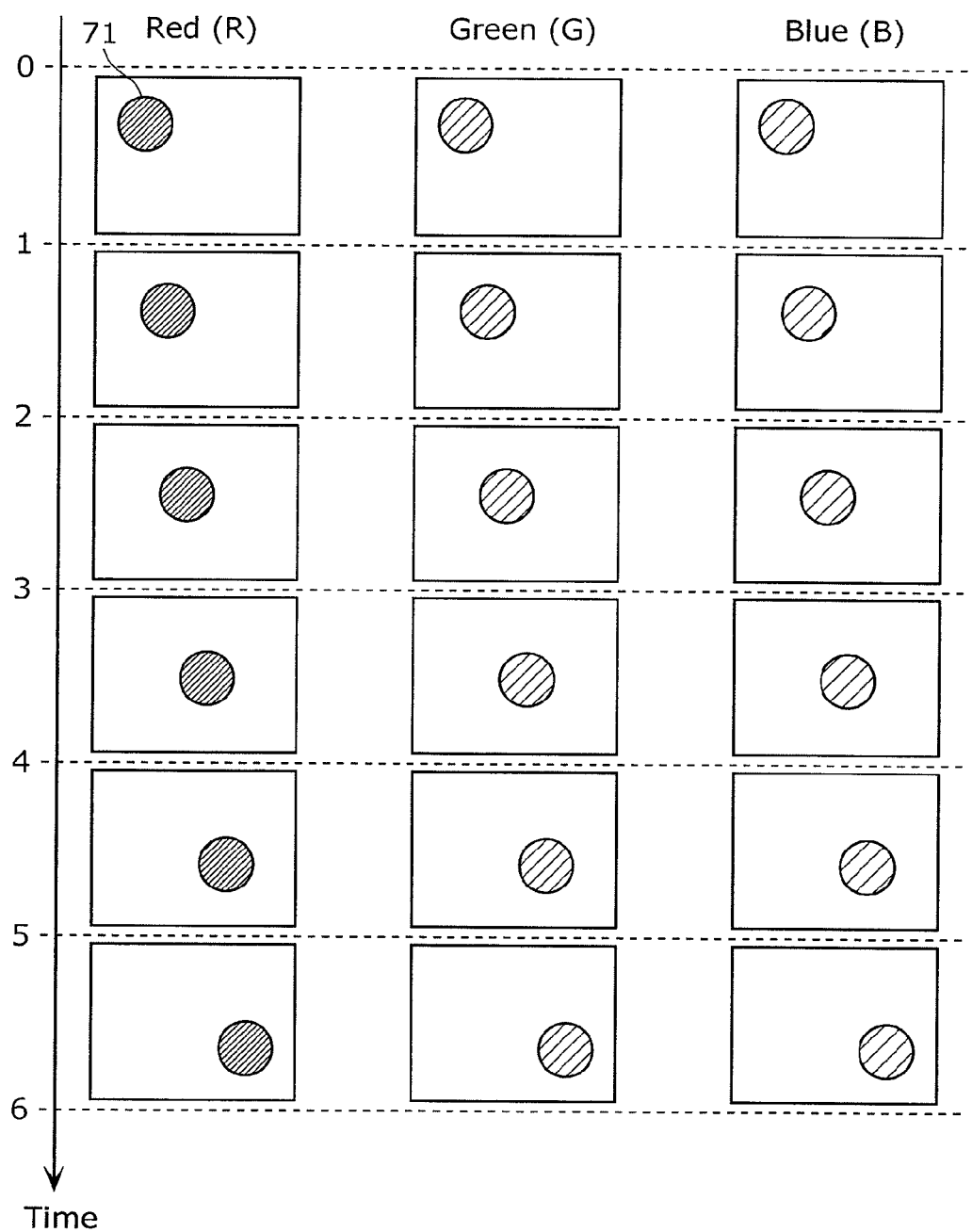
FIG. 8 is a diagram showing an example of ideal frame images of the target video sequence to be generated.

FIG. 8 shows an example of frame images to be supposedly obtained when the subject can be shot in color at a high frame rate. The frame images shown in FIG. 8 cannot be obtained in the actual image capturing, and so these images are shown merely for the purpose of explanation. FIG. 8 is a diagram showing an example of ideal frame images of the target video sequence that are to be generated.

In FIG. 8, the vertical axis denotes time and the horizontal axis denotes the color components. Six frame images are shown in the direction from top to bottom in chronological order for each of the red, green, and blue components which are shown from left to right. Note that imaginary exposure periods of the three frames arranged in the horizontal direction are the same. In FIG. 8, a subject 71 which is moving from the upper left to the lower right in the frame is shown in all the frame images of each color component.

In actuality, such a subject is shot with a frame interval longer than the frame interval shown in FIG. 8. As a result, a plurality of input moving images in which a frame exposure period (at least either the exposure start time or the exposure end time) is different for each of the different color components are obtained (step S301 in FIG. 3).

Figure 9:
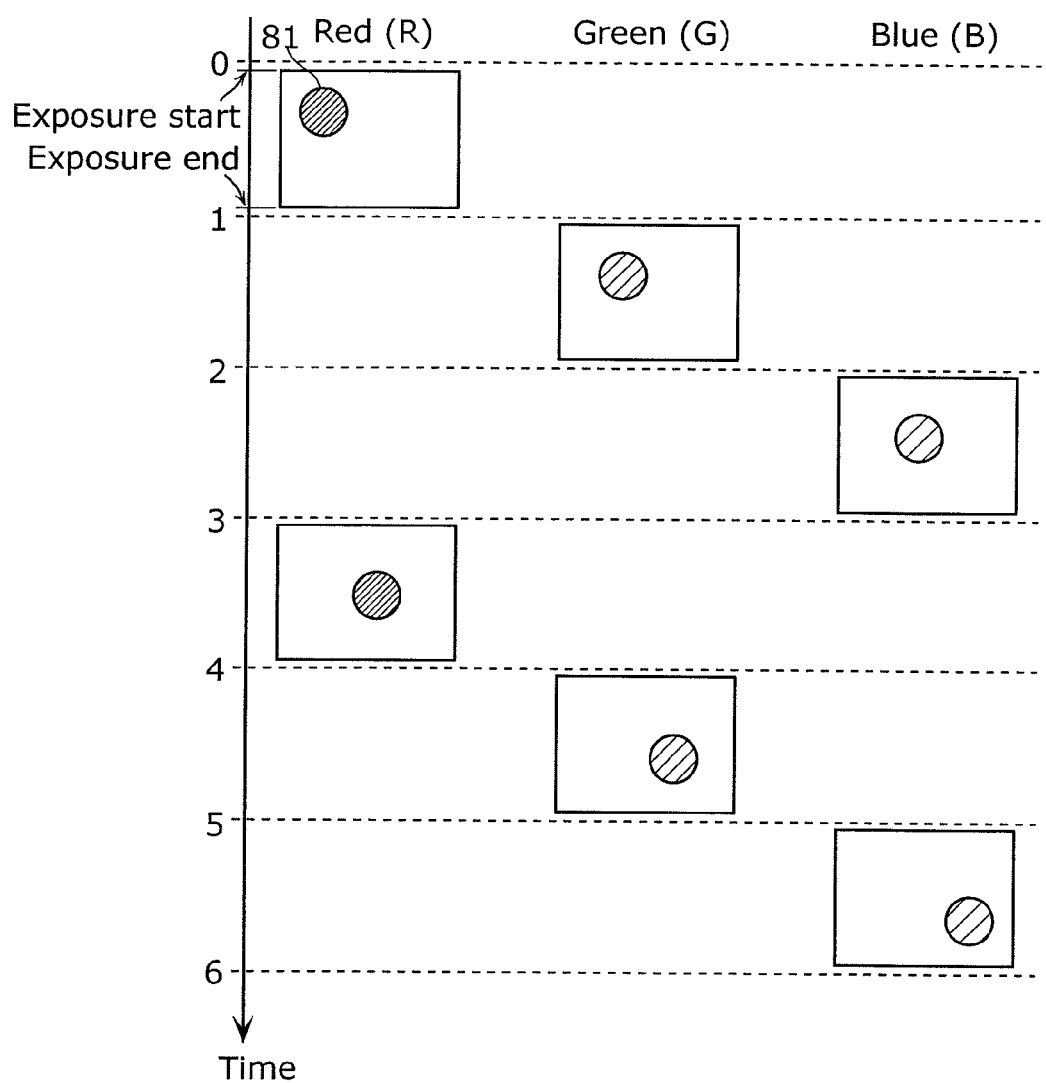
FIG. 9 is a diagram showing an example of frame images of input video sequences.
Figure 10:
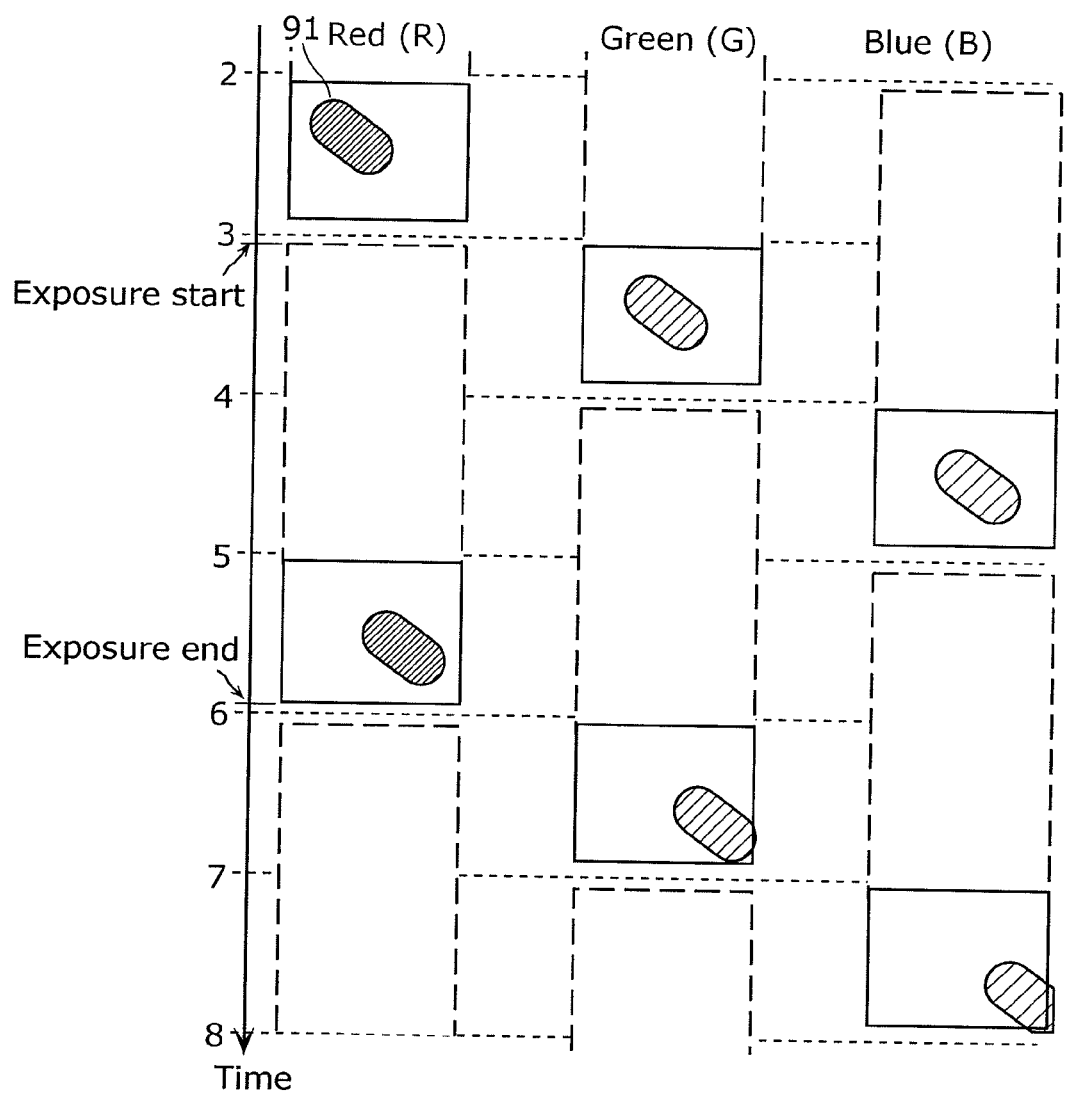
FIG. 10 is a diagram showing an example of frame images of input video sequences.

FIG. 9 and FIG. 10 each show an example of the plurality of input moving images obtained by shooting the subject 71 shown in FIG. 8.

FIG. 9 is a diagram showing an example of frame images obtained by shooting the subject 71 according to the frame exposure period shown in FIG. 4 (*b*). For the sake of convenience, upper and lower edges of an individual frame are illustrated at positions in the vertical axis corresponding to the frame exposure start time and frame exposure end time, respectively. The frame exposure periods of the color components do not coincide, and each frame exposure period is approximately equivalent to the frame interval shown in FIG. 8. In each of the frame images shown in FIG. 9, an image 81 of the subject 71 appears.

FIG. 10 is a diagram showing an example of frame images obtained by shooting the subject 71 according to the frame exposure period shown in FIG. 4 (*a*). For the sake of convenience, an upper edge of a dashed line box extending from an individual frame and a lower edge of the frame are illustrated at positions in the vertical axis corresponding to the frame exposure start time and frame exposure end time, respectively. The frame exposure periods of the color components do not coincide, and each frame exposure period is approximately equivalent to three times the frame interval shown in FIG. 8. Since each frame exposure period is long, the frame exposure periods of the different color components are overlapping. In every frame image shown in FIG. 10, an image 91 of the subject 71 appears with blurring in the moving direction of the subject 71.

Figure 11:
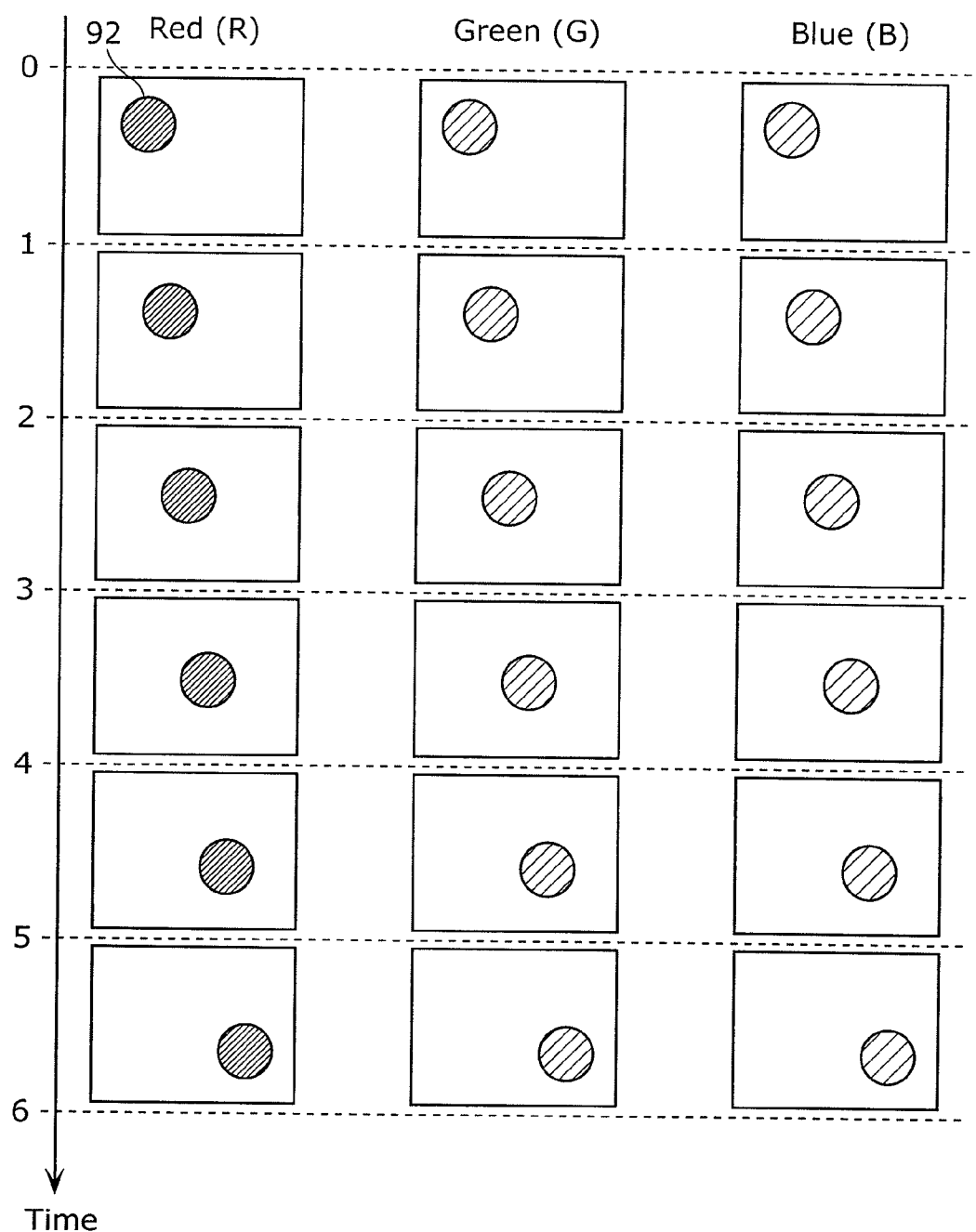
FIG. 11 is a diagram showing an example of frame images of a generated target video sequence.

FIG. 11 shows an example of frame images of the target video sequence generated from the frame images of the input video sequences shown in FIGS. 9 and 10, through the aforementioned procedure (steps S302 to S306 in FIG. 3).

Although an image 92 in the generated frame images still has blurring in the moving direction of the subject 71, it is minute as compared to the blurring included in the frame images shown in FIG. 10. Moreover, frame images are interpolated at times when such images do not exist in the input moving images of the color components shown in FIGS. 9 and 10. Accordingly, the generated frame images turn out to be close to the ideal frame images shown in FIG. 8.

As described above, such frame images are generated by calculating the pixel values of the target moving images that maintain the motion constraint condition, the color space constraint condition, and the reduction constraint condition. The motion constraint condition indicates that the pixel values of the target moving image should be continuous in accordance with the motion of the subject (that is, the pixel values should be uniform). The color space constraint condition indicates that the colors of the pixels which are spatiotemporally adjacent in the target moving image should be continuous (that is, the colors or the changes in color should be uniform). The reduction constraint condition indicates that a frame image of the input video sequence should approximate to a weighted sum of a plurality of frame images of the target video sequence which are included in a period that corresponds to this frame image of the input video sequence.

With an increase in accuracy of motion estimation, the frame images closer to the ideal frame images shown in FIG. 8 can be obtained.

Figure 12:
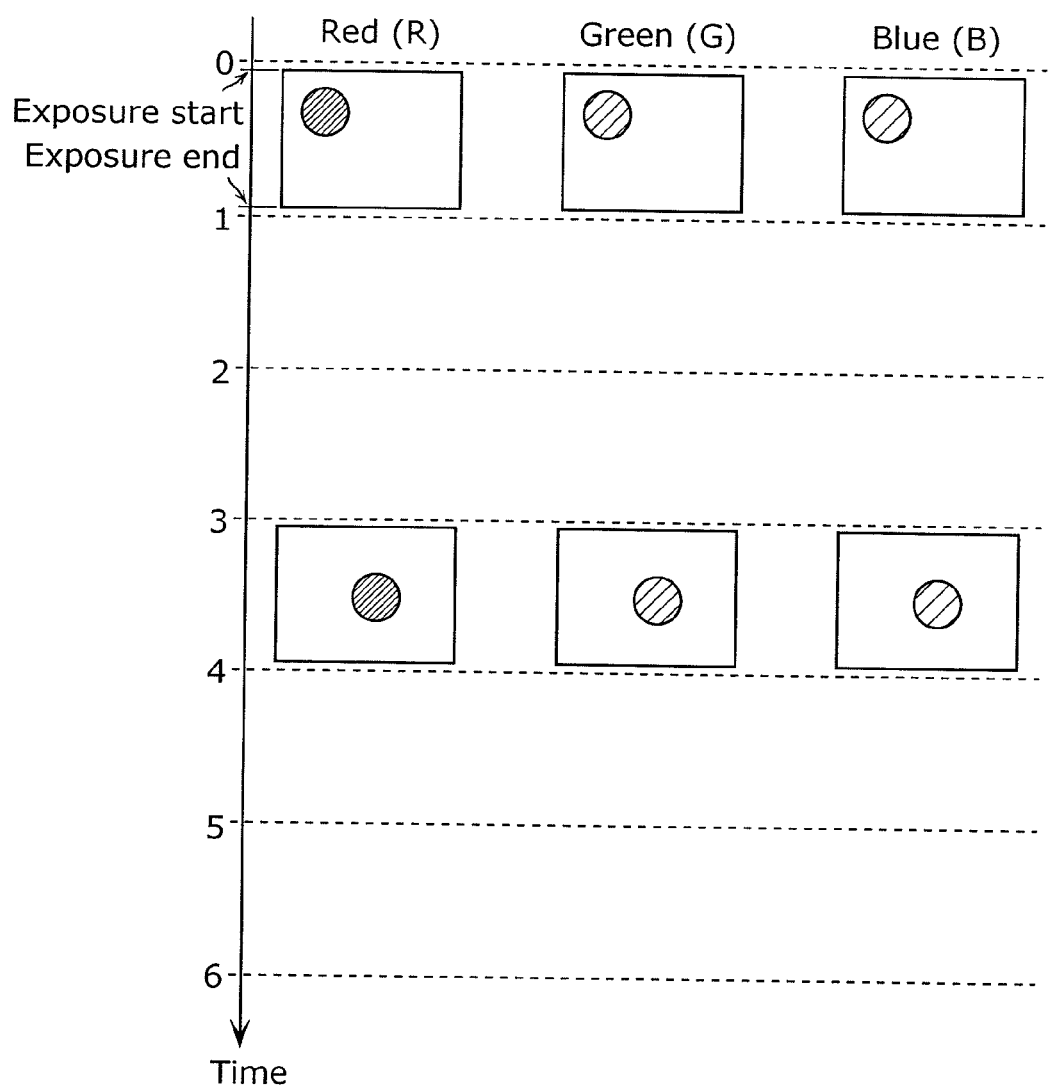
FIG. 12 is a diagram showing an example of different video sequences which are equivalent, in the data rate, to the input video sequences.
Figure 13:
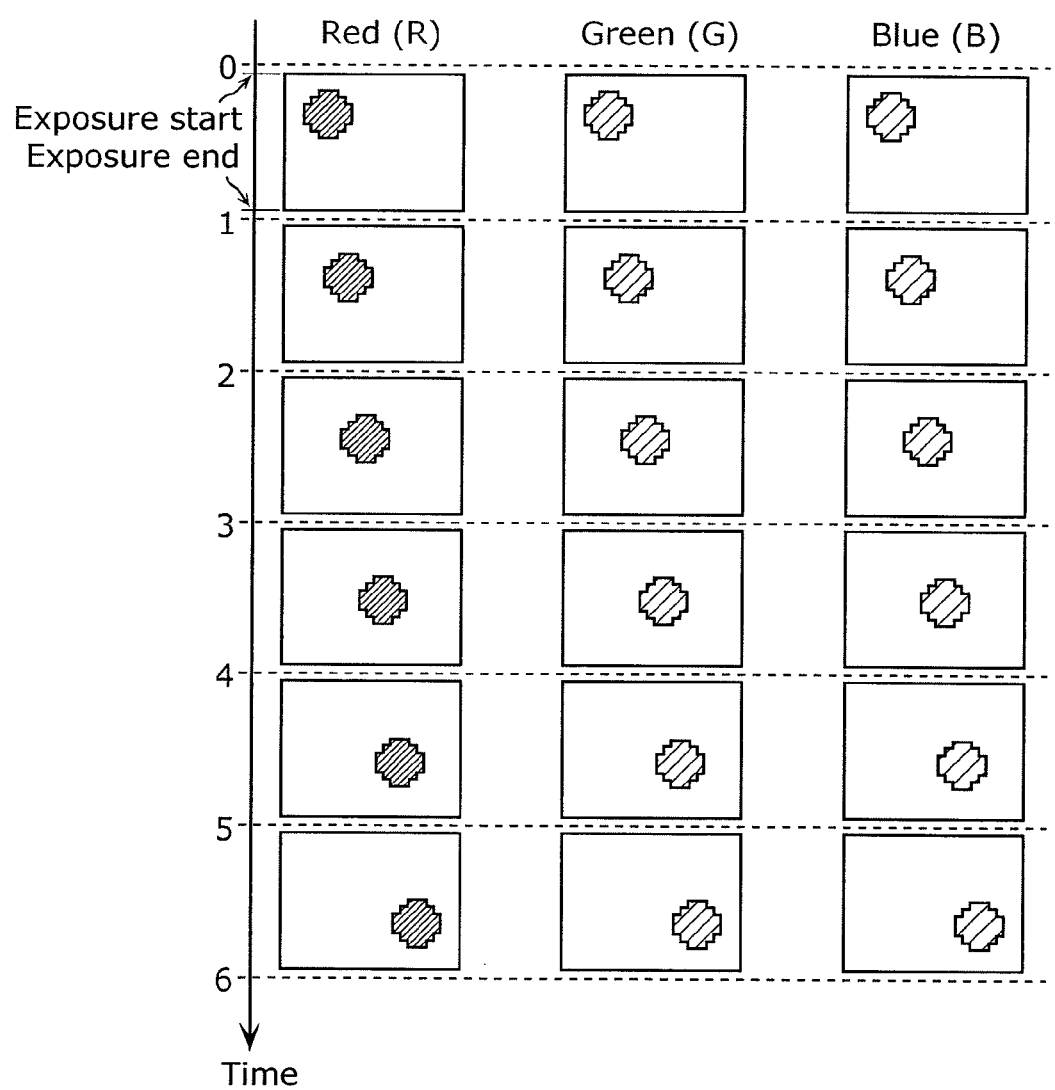
FIG. 13 is a diagram showing an example of different video sequences which are equivalent, in the data rate, to the input video sequences.

FIGS. 12 and 13 each show an example of moving images whose amount of information per unit time (i.e., a necessary transfer rate, which is referred to as the data rate hereafter) is equivalent to the data rates of the input moving images shown in FIGS. 9 and 10.

Unlike the input video sequences obtained by the image generation apparatus of the present invention whereby the frame exposure periods of the color components do not coincide, the video sequences shown in FIGS. 12 and 13 are obtained by taking all the frames of all the color components with the same frame exposure period. For the video sequences of FIG. 13, the frame rate is increased and the resolution of the frame images is reduced so as to achieve the data rate equivalent to those of the input video sequences shown as examples in FIGS. 9 and 10.

The input video sequences shown as examples in FIGS. 12 and 13 can be obtained at one time by using, for instance, a well-known technique whereby the same subject is shot in different resolutions at different frame rates. In addition, these input video sequences can also be obtained separately through usual image capturing.

However, such video sequences that have the same frame exposure period for all of the color components are excluded from the input video sequences to be obtained by the image generation apparatus of the present invention.

The image generation apparatus of the present invention is characterized in that the target video sequence in color is generated at a high frame rate, by setting the aforementioned constraint conditions (the color space constraint condition, in particular) using the plurality of input video sequences in which the frame exposure periods (at least either the exposure start time or the exposure end time) of at least two color components out of the plurality of different color components do not coincide with each other.

The temporal peaks caused in the amount of information of the input video sequences are distributed by using the input video sequences in which the frame exposure periods of at least two color components do not coincide with each other. On account of this, the temporal peaks caused in the amount of information can be eased as compared to the video sequences shown in FIG. 12, for example, where the frames of all the color components are obtained at the same timing.

Moreover, even in the case where the longer exposure period may cause motion blurring, video information obtained because of the different exposure start times (or the different exposure end times) can be used. Thus, the target video sequence having less motion blurring and a high frame rate can be generated.

Furthermore, the exposure period employed in the image capturing can be set longer than the frame interval of the target video sequence. This allows the image capturing to be performed with the longer exposure period without reducing the frame rate, in a dark environment where the amount of light is insufficient. This is to say, there is an advantage of maintaining the frame rate and enabling the target video sequence with a higher S/N ratio to be generated.

Note that whether or not the input video sequences in which the frame exposure periods do not coincide among the color components are used for generating the target video sequence is determined on the basis of the following. That is, when the target video sequence is generated from the input video sequences obtained by shooting the subject that include a change abruptly occurring at a different time for each of the color components, the resultant temporal differences of the change are supposed to be shown in the generated target video sequence.

The above description has been given on the assumption that the input video sequences of the color components have the same frame rate, the same frame exposure period, and the same frame-image resolution. However, the image generation apparatus of the present invention can be applied to a case where at least one of the frame rate, frame exposure period, and frame-image resolution of the input video sequence is different for each color component.

To be more specific, in such a case, equations representing reduction constraint conditions are formed as replacements for Equation 1, Equation 2, and Equation 3 respectively according to the frame rates, frame exposure periods, and frame-image resolutions of the input video sequences of the color components. Then, the target video sequence is generated in the same procedure as described above. As a consequence, the same advantage as in the present invention can be produced.

In this case here, respective differences among the color components in their exposure start times (or their exposure end times) are approximated closely, and respective differences among the color components in their exposure periods are approximated closely. Accordingly, an advantage of leveling out temporal image-quality variations in the target video sequence obtained by shooting a typical subject can be expected.

Figure 14:
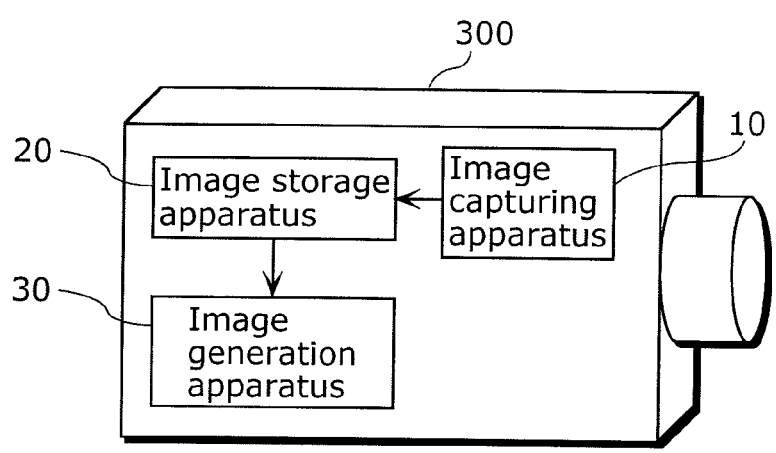
FIG. 14 is a block diagram showing a configuration of a camera that is a modification of the image generation system.

The present invention also includes a camera 300 that is configured by omitting the display apparatus 40 from the image generation system 100 shown in FIG. 1, as shown in FIG. 14. Moreover, the present invention includes a camera with a video recording/reproducing function that is configured by adding the display apparatus 40 to the camera 300 shown in FIG. 14.

Figure 15:
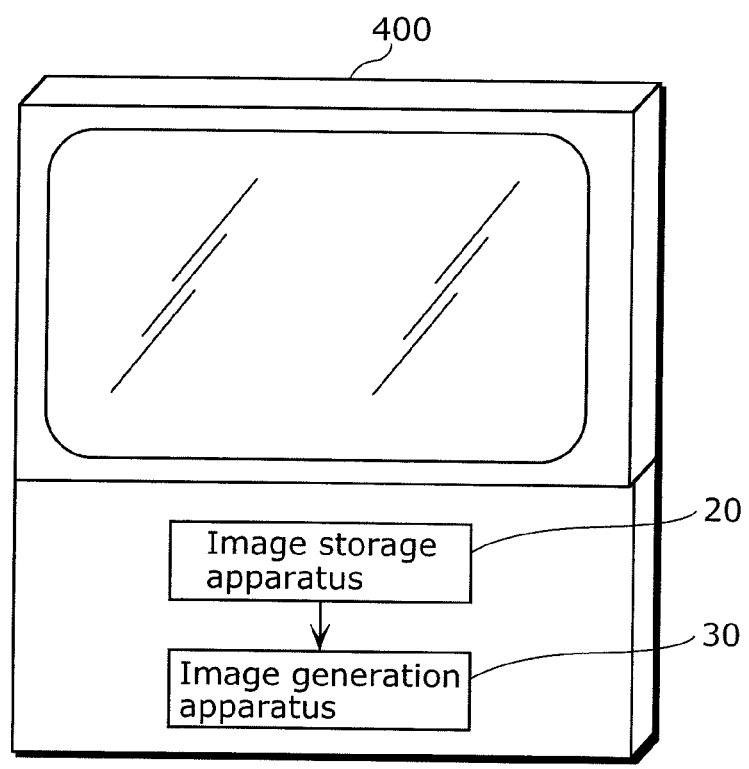
FIG. 15 is a block diagram showing a configuration of a display appliance that is a modification of the image generation system.

Furthermore, the present invention includes a display appliance 400, such as a TV, that is configured by omitting the image capturing apparatus 10 from the image generation system 100 shown in FIG. 1, as shown in FIG. 15. Such a display appliance 400 can generate and display a target video sequence with the improved frame rate using video sequences, as the input video sequences, of a plurality of color components that have been recorded in advance.

Figure 16:
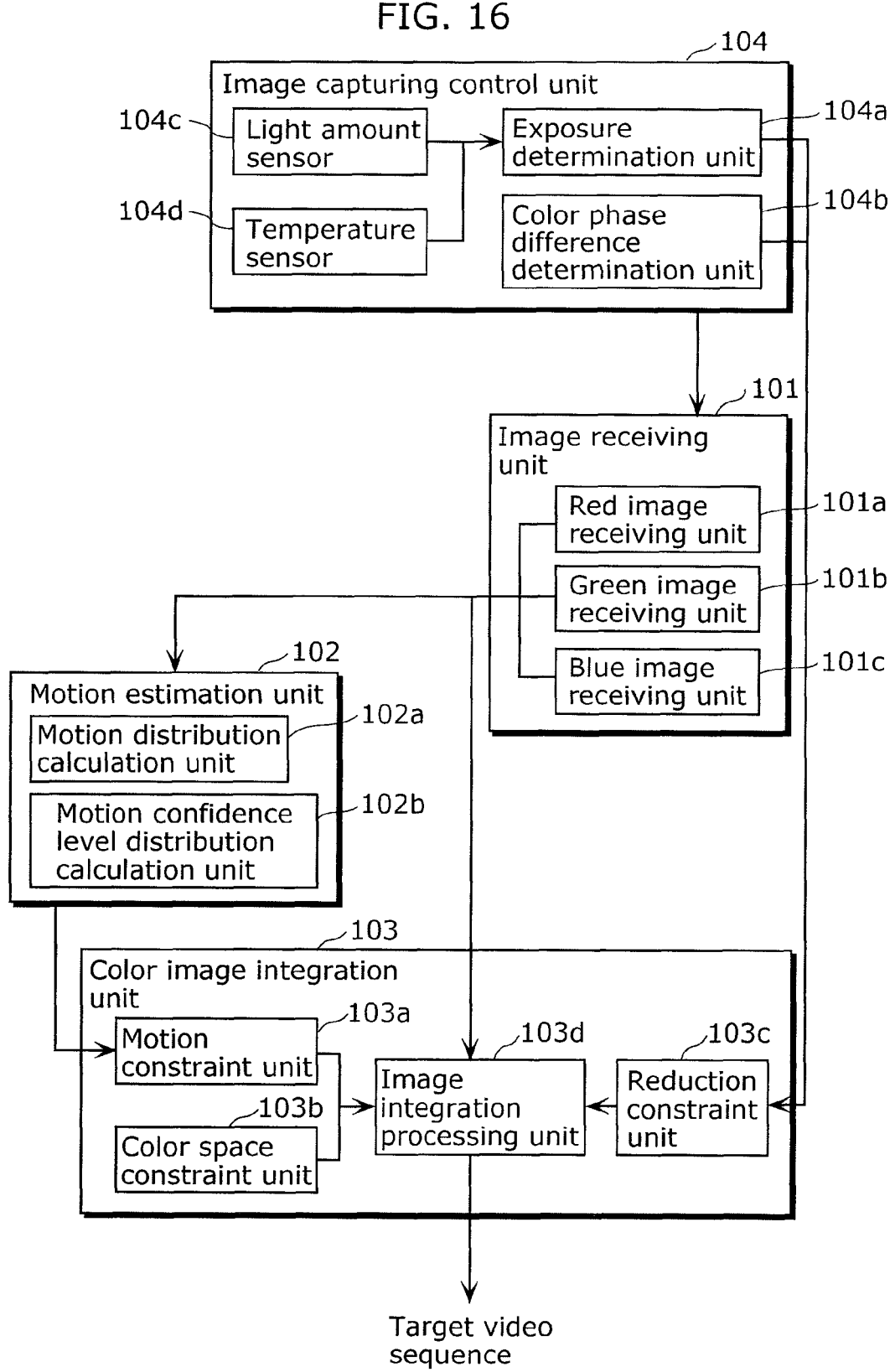
FIG. 16 is a function block diagram showing a configuration of an image generation apparatus in the embodiment.

In the case where a camera is configured as shown in FIG. 14, an image capturing control unit 104 may be added to the image generation apparatus of FIG. 1, as shown in FIG. 16. With this configuration, differences (referred to as the color phase differences) among the color components in the frame exposure timings (at least either their exposure start times or their exposure end times) and their exposure periods may be changed depending on a subject.

In FIG. 16, an exposure determination unit 104a determines an exposure period for each color component. A color phase difference determination unit 104b sets an amount of timing difference in the exposure start times (or the exposure end times) among the color components. A light amount sensor 104c measures an amount of light reflected from the subject. The light amount sensor may be provided separately from the imaging element, or the imaging element itself may be used as the light amount sensor. A temperature sensor 104d measures a temperature of the imaging element.

Next, processing executed by the camera that is configured as described so far is explained.

Figure 17:
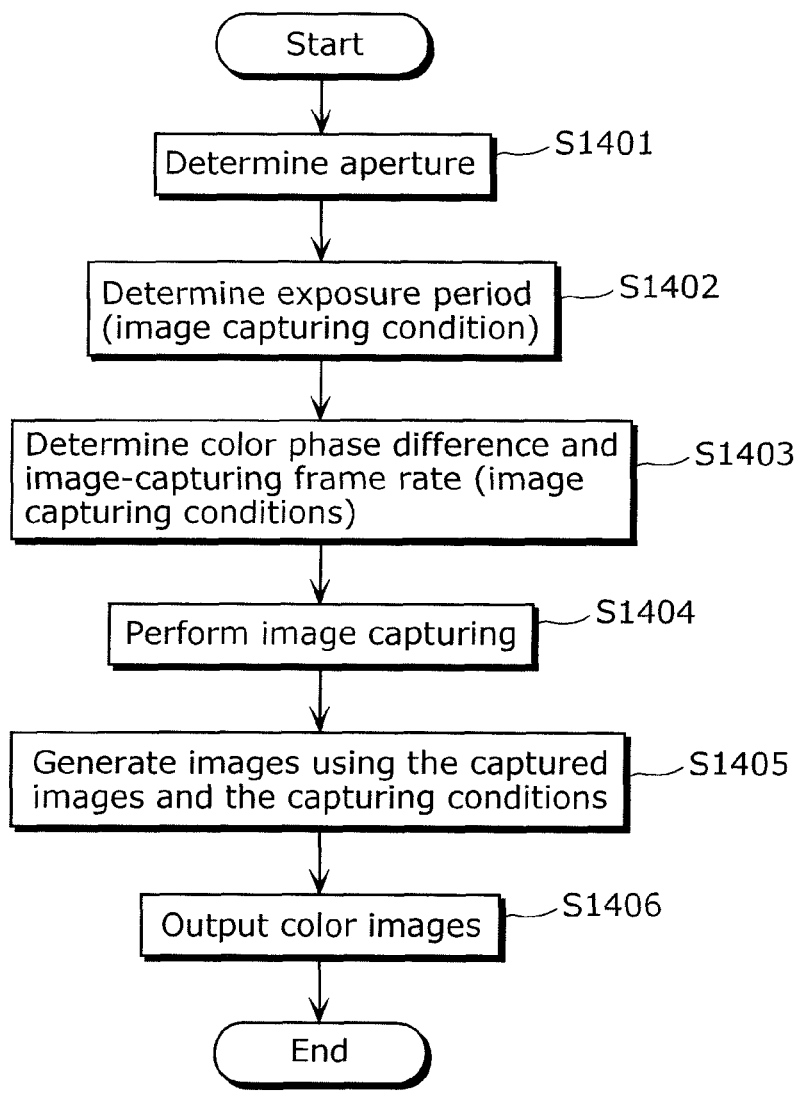
FIG. 17 is a flowchart showing an operation performed by the image generation apparatus.
Figure 19:
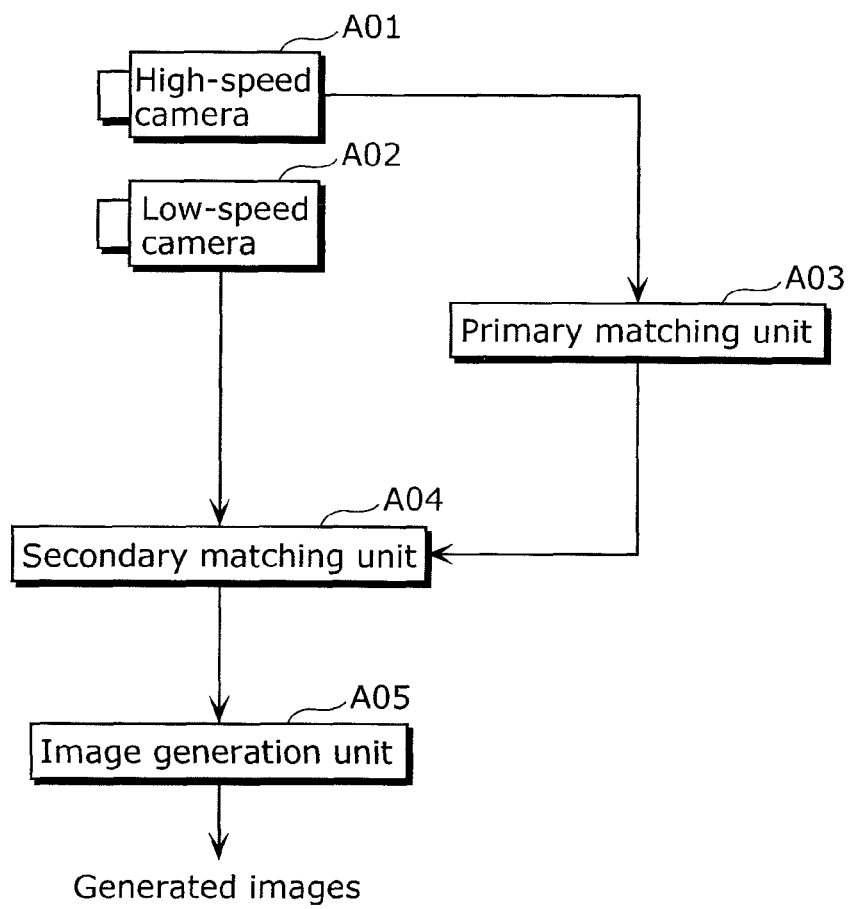
FIG. 19 is a block diagram showing a configuration of a conventional image generation apparatus.
Figure 20:
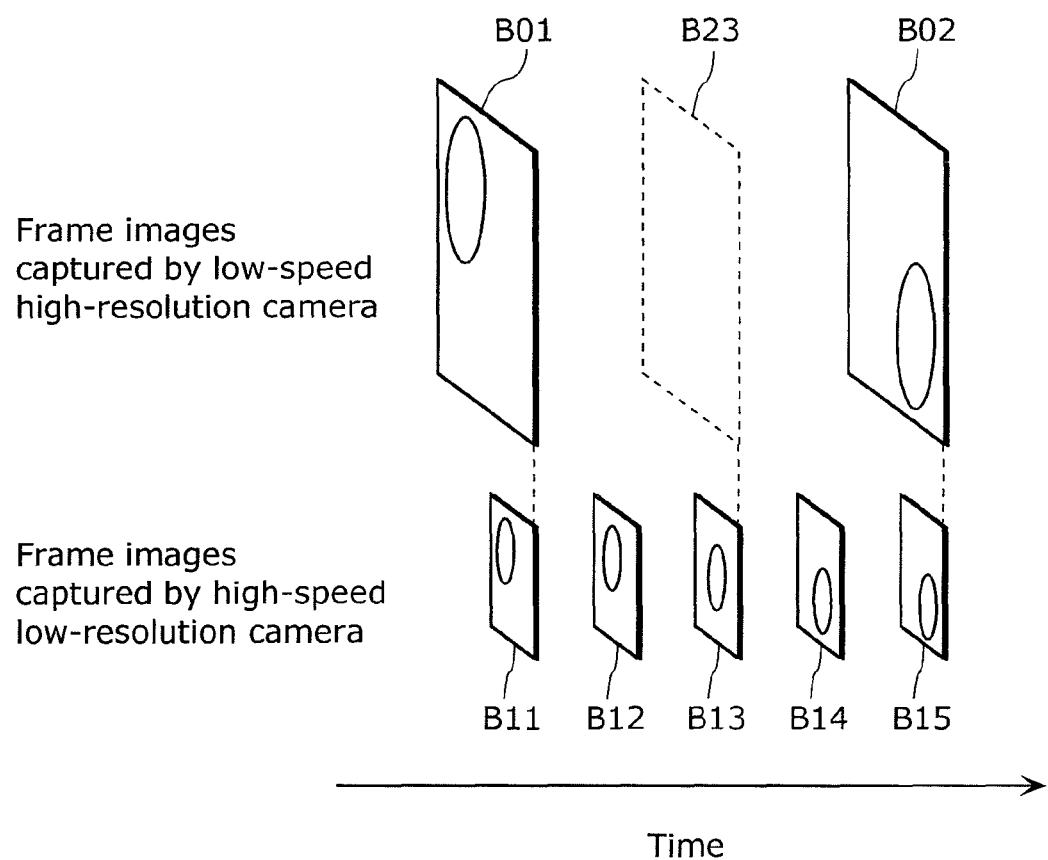
FIG. 20 is a diagram showing two video sequences inputted to the conventional image generation apparatus.

FIG. 17 is a flowchart of the processing executed by the camera.

In step S1401, the light amount sensor 104c measures the amount of light reflected from the subject, and determines an aperture in accordance with the amount of light reflected from the subject. In step S1402, the temperature sensor 104d measures the temperature of the imaging element, and the exposure determination unit 104a determines the frame exposure period necessary in image capturing for each color component on the basis of the amount of light reflected from the subject and the aperture determined in the aforementioned step and the obtained temperature.

At this time, an S/N ratio necessary for a captured image is preset. As noise in the captured image, there are components depending on the temperature of the imaging element and components included in the incident light itself. Since the temperature-dependent properties of the temperature-dependent noise varies according to the imaging element, a relation between temperature and noise is obtained in advance. The intensity of noise included in the incident light itself is proportional to the square root of a signal intensity S of the incident light. The signal intensity S can be determined from the amount of light reflected from the subject and the aperture. A noise intensity N can be determined from the temperature and the amount of incident light. The S/N ratio improves with increase in the amount of light. On account of this, a necessary exposure period is determined on the basis of the necessary S/N ratio.

The exposure period may be steplessly changed with respect to the temperature, the amount of light, and the S/N ratio. Alternatively, the exposure period may be changed stepwise for each predetermined step, or may be changed in binary based on a predetermined threshold as a reference.

For example, suppose that the ratio of the signal intensity to the noise intensity is 100. In this case, when the noise intensity is 10, the exposure period is determined such that the necessary signal intensity becomes 1000. In the above description, the necessary exposure period is determined on the basis of the temperature and the amount of light. However, on the assumption that the temperature is at an average value, the necessary exposure period may be determined only on the basis of the amount of light reflected from the subject. Moreover, the order in which steps S1401 and S1402 are executed may be changed.

Next, in step S1403, the color phase difference determination unit 104b determines the amount of difference in the exposure start time (or the exposure end time). At this time, suppose that a value obtained by dividing the exposure period by the number of color components (namely, 3 in the case of red, green, and blue) is smaller than the standard video frame rate, i.e., 30 to 60 frames per second. In such a case, the frame rate for each color component is set at a value equivalent to 1/3 (3 indicates the number of color components) of the standard video frame rate, and the color phase difference is set at a standard video frame interval.

Meanwhile, suppose that the value obtained by dividing the exposure period by the number of color components (namely, 3 in the case of red, green, and blue) is larger than the standard video frame rate, i.e., 30 to 60 frames per second. In such a case, the frame interval of each color component is set corresponding to the exposure period of the color component, and the color phase difference is set at a value equivalent to 1/3 (3 indicates the number of color components) of the exposure period.

Next, in step S1404, image capturing is performed according to the above image capturing conditions, and thus the input video sequences are obtained through the image capturing. In step S1405, the target video sequence is generated by executing the procedure shown in FIG. 3. In step S1406, the generated target video sequence is outputted.

Note that the frame interval of the target video sequence to be generated can be set shorter, independently of the color phase difference in the image capturing. With the shorter frame interval, the exposure period in the image capturing is increased and the frame rate is thus reduced. In such a case too, the target video sequence having the standard video frame rate can be generated.

In this case, the reduction constraint conditions in Equation 1, Equation 2, and Equation 3 are set such that the exposure period of the target video sequence becomes shorter and the frame rate of the target video sequence is thus increased.

Likewise, the motion vector calculations performed in Equation 5, Equation 6, and Equation 7 may be similarly executed with respect to shorter frame intervals, and Qm in Equation 8 may be set using the corresponding motions.

Also, as shown by an example in FIG. 18, an exposure period may be changed depending on a color component. The example of FIG. 18 (a) shows that: the exposure period and the frame interval of G are longer ($e_G=4$, $f_G=4$); R and B have the same exposure period and the same frame interval ($e_R=e_B=2$, $f_R=f_B=2$); and the exposure start time (or the exposure end time) is different for each color component ($t_{R0}=1$, $t_{G0}=0$, $t_{B0}=0$).

In this case too, the target video sequence having a high frame rate as shown in FIG. 18 (b) can be obtained through the same procedure as described above. The longer frame exposure period for all the color components causes the temporal resolution to be easily reduced. However, by increasing the frame exposure periods of only some of the color components, it becomes possible to maintain compatibility between the ensuring of the amount of light by the long exposure and the temporal resolution.

The above description has been given as to a case where at least either the frame exposure start time or the frame exposure end time is changed among the three color components. However, the same advantage can be produced even in a case where the frame exposure start time is changed only between two of the color components (for example, the exposure start time (or the exposure end time) is the same between the red component and the blue component, and is changed only for the green component).

In this case, although the advantage of distributing the temporal peaks caused to the amount of information of the input video sequences decreases, the processing to generate the target video sequence is simplified. Moreover, the number of color components may be more than three. The advantage of the present invention can be produced even in a case where new green that is different in the light wavelength characteristics is added to the three red, green, and blue components and then input video sequences of these four color components are used. In particular, this is suitable for an application whereby the subject is shot through multispectral image capturing.

Up to this point, the image generation apparatus of the present invention has been described on the basis of the embodiment. However, the present invention is not limited to the present embodiment. The present invention includes embodiments obtained through the application of various modifications, that may be conceived by a person with an ordinary skill in the art, to the present embodiment.

The image generation processing performed by the image generation apparatus of the present invention may be executed in whole or in part by a dedicated hardware appliance. Or, the image generation processing of the present invention may be performed by causing a CPU, which is built in a computer terminal apparatus, a communication appliance installed in a wireless base station or the like, or a stand-alone general-purpose computer, to execute a predetermined program.

INDUSTRIAL APPLICABILITY

As an image generation apparatus that generates a new video sequence from a plurality of video sequences each corresponding to a different color and having a different exposure start time (or a different exposure end time), the present invention can be used in particular as an image generation apparatus that generates a video sequence having a high frame rate from RGB video sequences each having a different exposure start time (or a different exposure end time). Also, the present invention can be used in particular, for example, as a video appliance, a video system, a video synthesis apparatus, a video editing apparatus, an image reconstruction apparatus, and an image reconstruction program, in which the above image generation apparatus is incorporated.

The invention claimed is:

1. An image generation apparatus that generates a target video sequence in color from a plurality of input video sequences, each input video sequence corresponding to a different color component of a plurality of color components, said image generation apparatus comprising:
   an image receiving unit configured to receive, as the plurality of input video sequences, a plurality of video sequences obtained by shooting a same subject with a phase difference, such that at least one of (i) exposure start times for the color components corresponding to the received video sequences are different from each other and (ii) exposure end times for the color components corresponding to the received video sequences are different from each other; and
   an image integration processing unit configured to generate the target video sequence having a frame interval which is shorter than each frame exposure period of the received video sequences,
   wherein each respective frame exposure period of the frame exposure periods is a period between an exposure start time and a corresponding exposure end time of a frame within a respective received video sequence of the received video sequences, and
   wherein the target video sequence is generated from the plurality of received video sequences by reducing a sum of a difference, for each of the different color components, between a value of a frame image of one of the frame exposure periods of one of the received video sequences and a sum of values of a plurality of frame images of the target video sequence included in the one frame exposure period of the received video sequence.

2. The image generation apparatus according to claim 1, further comprising an image capturing control unit configured to determine an amount of delay between the frame exposure periods of the received video sequences according to image capturing condition information regarding an amount of noise included in the received video sequences,
    wherein the video sequences received by said image receiving unit are obtained by shooting the same subject with the phase difference according to the determined amount of delay.

3. The image generation apparatus according to claim 2,
    wherein the image capturing condition information indicates an amount of light received from the subject, and
    wherein said image capturing control unit is configured to increase the phase difference as the amount of received light indicated by the image capturing condition information decreases.

4. The image generation apparatus according to claim 2,
    wherein the image capturing condition information indicates a temperature of an imaging element that shoots the subject, and
    wherein said image capturing control unit is configured to increase the phase difference as the temperature indicated by the image capturing condition information increases.

5. The image generation apparatus according to claim 1, wherein said image integration processing unit is configured to generate each frame image of the target video sequence, such that a frame of each color component in the target video sequence changes at a time when a frame of at least one received video sequence of the plurality of received video sequences changes.

6. The image generation apparatus according to claim 1, wherein the video sequences received by said image receiving unit are obtained by shooting the subject, such that respective time intervals between the exposure start times of the different color components are equal or such that respective time intervals between the exposure end times of the different color components are equal.

7. The image generation apparatus according to claim 1, further comprising a color space constraint unit configured to set a color space constraint condition indicating that colors of pixels spatiotemporally adjacent in the target video sequence should be continuous,
    wherein said image integration processing unit is configured to generate the target video sequence by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, and (ii) the color space constraint condition indicating that the colors of the pixels spatiotemporally adjacent in the target video sequence should be continuous.

8. The image generation apparatus according to claim 7, wherein said color space constraint unit is configured to separately set, as the color space constraint condition, a first constraint condition indicating that luminance of the adjacent pixels should be continuous and a second constraint condition indicating that chrominance of the adjacent pixels should be continuous.

9. The image generation apparatus according to claim 7, further comprising:
    a motion estimation unit configured to estimate a motion of the subject from at least one received video sequence of the plurality of received video sequences; and
    a motion constraint unit configured to set a motion constraint condition indicating that values of pixels in the target video sequence should be continuous based on the estimated motion,
    wherein said image integration processing unit is configured to generate the target video sequence by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, (ii) the color space constraint condition indicating that the colors of the pixels spatiotemporally adjacent in the target video sequence should be continuous, and (iii) the motion constraint condition indicating that the values of the pixels in the target video sequence should be continuous based on the estimated motion which estimates the subject from one of the different color components.

10. The image generation apparatus according to claim 1, wherein each frame exposure period, of the frame exposure periods, of a respective received video sequence of the received video sequences corresponding to one color component of the plurality of color components overlaps at least another frame exposure period, of the frame exposure periods, of other received video sequences, of the received video sequences, corresponding to another color component of the plurality of color components.

11. An image generation method of generating a target video sequence in color from a plurality of input video sequences, each input video sequence corresponding to a different color component of the plurality of color components, said image generation method comprising:
    receiving, as the plurality of input video sequences, a plurality of video sequences obtained by shooting a same subject with a phase difference, such that at least one of (i) exposure start times for the color components corresponding to the received video sequences are different from each other and (ii) exposure end times for the color components corresponding to the received video sequences are different from each other; and
    generating the target video sequence having a frame interval which is shorter than each frame exposure period of the received video sequences,
    wherein each respective frame exposure period of the frame exposure periods is a period between an exposure start time and a corresponding exposure end time of a frame within a respective received video sequence of the received video sequences, and
    wherein the target video sequence is generated from the plurality of received video sequences by reducing a sum of a difference, for each of the different color components, between a value of a frame image of one of the frame exposure periods of one of the received video sequences and a sum of values of a plurality of frame images of the target video sequence included in the one frame exposure period of the received video sequence.

12. The image generation method according to claim 11, wherein the image generation method further includes setting a color space constraint condition indicating that colors of pixels spatiotemporally adjacent in the target video sequence should be continuous, wherein the target video sequence is generated by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, and (ii) the color space constraint condition indicating that the colors of the pixels spatiotemporally adjacent in the target video sequence should be continuous.

13. The image generation method according to claim 12, wherein the image generation method further includes:
   estimating a motion of the subject from at least one received video sequence of the plurality of received video sequences; and
   setting a motion constraint condition indicating that values of pixels in the target video sequence should be continuous based on the estimated motion,
   wherein the target video sequence is generated by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, (ii) the color space constraint condition indicating that the colors of the pixels spatiotemporally adjacent in the target video sequence should be continuous, and (iii) the motion constraint condition indicating that the values of the pixels in the target video sequence should be continuous based on the estimated motion which estimates the subject from one of the different color components.

14. The image generation method according to claim 11, wherein each frame exposure period, of the frame exposure periods, of a respective received video sequence of the received video sequences corresponding to one color component of the plurality of color components overlaps at least another frame exposure period, of the frame exposure periods, of other received video sequences, of the received video sequences, corresponding to another color component of the plurality of color components.

15. A non-transitory computer-readable recording medium having a program recorded thereon, the program being for generating a target video sequence in color from a plurality of input video sequences, each input video sequence corresponding to a different color component of a plurality of color components, the program causing a computer to execute an image generation method comprising:
   receiving, as the plurality of input video sequences, a plurality of video sequences obtained by shooting a same subject with a phase difference, such that at least one of (i) exposure start times for the color components corresponding to the received video sequences are different from each other and (ii) exposure end times for the color components corresponding to the received video sequences are different from each other; and
   generating the target video sequence having a frame interval which is shorter than each frame exposure period of the received video sequences,
   wherein each respective frame exposure period of the frame exposure periods is a period between an exposure start time and a corresponding exposure end time of a frame within a respective received video sequence of the received video sequences, and
   wherein the target video sequence is generated from the plurality of received video sequences by reducing a sum of a difference, for each of the different color components, between a value of a frame image of one of the frame exposure periods of one of the received video sequences and a sum of values of a plurality of frame images of the target video sequence included in the one frame exposure period of the received video sequence.

16. The non-transitory computer-readable recording medium according to claim 15, wherein the image generation method further includes setting a color space constraint condition indicating that colors of pixels spatiotemporally adjacent in the target video sequence should be continuous,
   wherein the target video sequence is generated by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, and (ii) the color space constraint condition indicating that the colors of the pixels spatiotemporally adjacent in the target video sequence should be continuous.

17. The non-transitory computer-readable recording medium according to claim 16, wherein the image generation method further includes:
   estimating a motion of the subject from at least one received video sequence of the plurality of received video sequences; and
   setting a motion constraint condition indicating that values of pixels in the target video sequence should be continuous based on the estimated motion,
   wherein the target video sequence is generated by reducing a sum of (i) the difference, for each of the different color components, between the value of a frame image of one of the frame exposure periods of one of the received video sequences and the sum of values of the plurality of frame images of the target video sequence included in the one frame exposure period of the received video sequence, (ii) the color space constraint condition indicating that the colors of the pixels spatiotemporally adjacent in the target video sequence should be continuous, and (iii) the motion constraint condition indicating that the values of the pixels in the target video sequence should be continuous based on the estimated motion which estimates the subject from one of the different color components.

18. The non-transitory computer-readable recording medium according to claim 15, wherein each frame exposure period, of the frame exposure periods, of a respective received video sequence of the received video sequences corresponding to one color component of the plurality of color components overlaps at least another frame exposure period, of the frame exposure periods, of other received video sequences, of the received video sequences, corresponding to another color component of the plurality of color components.

* * * * *